United States Patent
Jiao

(10) Patent No.: US 12,157,056 B2
(45) Date of Patent: Dec. 3, 2024

(54) VIRTUAL ENVIRONMENT DISPLAY METHOD AND APPARATUS, DEVICE, AND STORAGE MEDIUM

(71) Applicant: TENCENT TECHNOLOGY (SHENZHEN) COMPANY LIMITED, Guangdong (CN)

(72) Inventor: Yong Rong Jiao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 382 days.

(21) Appl. No.: 17/454,697

(22) Filed: Nov. 12, 2021

(65) Prior Publication Data
US 2022/0072427 A1 Mar. 10, 2022

Related U.S. Application Data

(63) Continuation of application No. PCT/CN2021/095400, filed on May 24, 2021.

(30) Foreign Application Priority Data

Jun. 5, 2020 (CN) .......................... 202010507404.5

(51) Int. Cl.
*A63F 13/56* (2014.01)
*A63F 13/533* (2014.01)
*A63F 13/822* (2014.01)

(52) U.S. Cl.
CPC ............ *A63F 13/56* (2014.09); *A63F 13/533* (2014.09); *A63F 13/822* (2014.09); *A63F 2300/308* (2013.01); *A63F 2300/807* (2013.01)

(58) Field of Classification Search
CPC ...... A63F 13/56; A63F 13/533; A63F 13/822; A63F 2300/308; A63F 2300/807
See application file for complete search history.

(56) References Cited

U.S. PATENT DOCUMENTS

| | | | |
|---|---|---|---|
| 8,187,085 B2 * | 5/2012 | Coleman | A63F 13/58 463/32 |
| 10,019,828 B2 * | 7/2018 | Hayashida | A63F 13/58 |

(Continued)

FOREIGN PATENT DOCUMENTS

| | | |
|---|---|---|
| CN | 101582143 A | 11/2009 |
| CN | 105225050 A | 1/2016 |

(Continued)

OTHER PUBLICATIONS

Easter egg (media). In Wikipedia, The Free Encyclopedia. Retrieved Apr. 8, 2024, from https://en.wikipedia.org/w/index.php?title=Easter_egg_(media)&oldid=1215329228 (Year: 2024).*
International Search Report dated Aug. 24, 2021 in Application No. PCT/CN2021/095400.
Written Opinion of the International Searching Authority dated Aug. 24, 2021 in Application No. PCT/CN2021/095400.
"Glory of Kings international edition introduces new premium skins that can change the shape of defense towers!", Watch the sea listen tide play games, Feb. 7, 2020, https://www.sohu.com/a/371246620_120099903, 25 pages total.

(Continued)

*Primary Examiner* — William H McCulloch, Jr.
(74) *Attorney, Agent, or Firm* — Sughrue Mion, PLLC

(57) ABSTRACT

A virtual environment display method and apparatus, for human-machine interaction, which displays a first interface including object display pages of virtual objects belonging to a first group and object display pages of virtual objects in a second group, at least one virtual object having a skin on a corresponding object display page; switches, in response to skins that are owned by the virtual objects in the same group and that belong to the same skin series meeting a trigger condition, a specified environment element in a virtual environment to a virtual environment element corresponding to the skin series, the virtual environment for the virtual objects belonging to the first group and the virtual objects belonging to the second group to perform a movement; and displays a second interface including a picture (Continued)

acquired from the virtual environment, the virtual environment including the virtual environment element corresponding to the skin series.

20 Claims, 14 Drawing Sheets

(56) References Cited

U.S. PATENT DOCUMENTS

| | | | | |
|---|---|---|---|---|
| 10,762,721 | B2* | 9/2020 | Li | G06T 15/503 |
| 10,821,364 | B2* | 11/2020 | Laker | A63F 13/35 |
| 11,413,528 | B2* | 8/2022 | Wang | A63F 13/52 |
| 11,442,610 | B2* | 9/2022 | Qiu | G06F 3/04847 |
| 11,478,714 | B2* | 10/2022 | Lin | A63F 13/795 |
| 11,534,689 | B2* | 12/2022 | Matsushita | A63F 13/533 |
| 11,810,234 | B2* | 11/2023 | Jiao | A63F 13/75 |
| 2008/0220872 | A1* | 9/2008 | Midgley | A63F 13/12 463/42 |
| 2013/0231193 | A1 | 9/2013 | Heatherly et al. | |
| 2017/0103564 | A1* | 4/2017 | Hayashida | A63F 13/56 |
| 2021/0197089 | A1* | 7/2021 | Wang | A63F 13/52 |
| 2021/0228985 | A1* | 7/2021 | Matsushita | A63F 13/52 |
| 2022/0072427 | A1* | 3/2022 | Jiao | A63F 13/35 |
| 2023/0347242 | A1* | 11/2023 | Zhang | A63F 13/537 |

FOREIGN PATENT DOCUMENTS

| | | |
|---|---|---|
| CN | 106937531 A | 7/2017 |
| CN | 109603151 A | 4/2019 |
| CN | 111672112 A | 9/2020 |

OTHER PUBLICATIONS

"Royal Glory: Will these skins add local special effect? The couple skin and series skin gained!", watch the sea listen tide play games, Jan. 6, 2019, https://www.sohu.com/a/296882508_120099903.

Chinese Office Action for corresponding CN 202010507404.5, dated May 24, 2021.

International Search Report for PCT/CN2021/095400, dated Aug. 24, 2021.

* cited by examiner

VIRTUAL ENVIRONMENT DISPLAY METHOD AND APPARATUS, DEVICE, AND STORAGE MEDIUM

CROSS-REFERENCE TO RELATED APPLICATION(S)

This application is a by-pass continuation of International Application No. PCT/CN2021/095400 filed on May 24, 2021 and claims priority to Chinese Patent Application No. 202010507404.5 entitled "VIRTUAL ENVIRONMENT DISPLAY METHOD AND APPARATUS, DEVICE, AND STORAGE MEDIUM" filed with the China National Intellectual Property Administration on Jun. 5, 2020, the disclosures of which are incorporated by reference in their entireties.

FIELD

The disclosure relates to the field of human-computer interaction, and in particular, to a virtual environment display method and an apparatus, a device, and a storage medium.

BACKGROUND

In a three-dimensional virtual environment-based application such as a battle arena game, a user may change a scene of a virtual environment by controlling a virtual object to use a virtual prop.

By using a multiplayer online battle arena game as an example, the scene of the virtual environment is switched according to a specific date (for example, holiday) of a real world. For example, when the specific date of the real world is the Spring Festival, a game maker switches the scene of the virtual environment into a scene associated with the Spring Festival, for example, an element in the virtual environment is switched to an element with a lantern element or a lion element.

In the above case, switching of the scene of the virtual environment depends on the time change of the real world, and the scene of the virtual environment can be switched at the specific date, resulting in relatively single scene type of the switching.

SUMMARY

Certain embodiments may provide a virtual environment display method and an apparatus, a device, and a storage medium. By establishing a correspondence between a skin owned by a virtual object and a virtual environment element, a specified environment element in a virtual environment is switched, so that a plurality of scene types can be switched for the virtual environment. The technical solutions are as follows.

According to an aspect of the disclosure, a virtual environment display method is provided, including:
  displaying a first interface, the first interface including object display pages of a plurality of virtual objects belonging to a first group and object display pages of a plurality of virtual objects belonging to a second group, at least one virtual object having a skin on a corresponding object display page;
  switching, in response to determining that a certain number of skins are owned by the plurality of virtual objects in the same group and that belong to the same skin series to meet a trigger condition, a specified environment element in a virtual environment to a virtual environment element corresponding to the skin series, the virtual environment being a virtual place for the plurality of virtual objects belonging to the first group and the plurality of virtual objects belonging to the second group to perform a movement; and
  displaying a second interface, the second interface including a picture acquired from the virtual environment, the virtual environment including the virtual environment element corresponding to the skin series.

According to another aspect of the disclosure, a virtual environment display method is provided, including:
  displaying a first interface, the first interface including object display pages of a plurality of virtual objects belonging to a first group and object display pages of a plurality of virtual objects belonging to a second group;
  obtaining map fragments owned by the plurality of virtual objects belonging to the first group and map fragments owned by the plurality of virtual objects belonging to the second group;
  switching, if a quantity of map fragments that are owned by the plurality of virtual objects in the same group and that belong to the same environment series reaches a threshold, a specified environment element in a virtual environment to a virtual environment element corresponding to the environment series, the virtual environment being a virtual place for the plurality of virtual objects belonging to the first group and the plurality of virtual objects belonging to the second group to perform a movement; and
  displaying a second interface, the second interface including a picture acquired from the virtual environment, the virtual environment including the virtual environment element corresponding to the environment series.

According to another aspect of the disclosure, a virtual environment display apparatus is provided, including:
  a first display module, configured to display a first interface, the first interface including object display pages of a plurality of virtual objects belonging to a first group and object display pages of a plurality of virtual objects belonging to a second group, at least one virtual object having a skin on a corresponding object display page; and
  a first element switching module, configured to switch, if skins that are owned by the plurality of virtual objects in the same group and that belong to the same skin series meet a trigger condition, a specified environment element in a virtual environment to a virtual environment element corresponding to the skin series, the virtual environment being a virtual place for the plurality of virtual objects belonging to the first group and the plurality of virtual objects belonging to the second group to perform a movement, and
  the first display module, configured to display a second interface, the second interface including a picture acquired from the virtual environment, the virtual environment including the virtual environment element corresponding to the skin series.

According to another aspect of the disclosure, a virtual environment display apparatus is provided, including:
  a second display module, configured to display a first interface, the first interface including object display pages of a plurality of virtual objects belonging to a first group and object display pages of a plurality of virtual objects belonging to a second group;
  a second obtaining module, configured to obtain map fragments owned by the plurality of virtual objects belonging to the first group and map fragments owned by the plurality of virtual objects belonging to the second group; and a second element switching module, configured to switch, if a quantity of map fragments that are owned by the plurality of virtual objects in the same group and that belong to the same environment series reaches a threshold, a specified environment element in a virtual environment to a virtual environment element corresponding to the environment series, the virtual environment being a virtual place for the plurality of virtual objects belonging to the first group and the plurality of virtual objects belonging to the second group to perform a movement, and the second display module, configured to display a second interface, the second interface including a picture acquired from the virtual environment, the virtual environment including the virtual environment element corresponding to the environment series.

According to another aspect of the disclosure, a computer device is provided, including: a processor and a memory, the memory storing at least one instruction, at least one program, a code set or an instruction set, the at least one instruction, the at least one program, the code set or the instruction set being loaded and executed by the processor to implement the virtual environment display method according to the aspects.

According to another aspect of the disclosure, a computer-readable storage medium is provided, storing at least one instruction, at least one program, a code set or an instruction set, the at least one instruction, the at least one program, the code set or the instruction set being loaded and executed by a processor to implement the virtual environment display method according to the aspects.

According to another aspect of the disclosure, a computer program product is provided, the computer program product, when run on a computer, causing the computer to perform the virtual environment display method according to the aspects.

BRIEF DESCRIPTION OF THE DRAWINGS

To describe the technical solutions in example embodiments of the disclosure more clearly, the following briefly introduces the accompanying drawings for describing example embodiments. The accompanying drawings in the following description show only some embodiments of the disclosure, and a person of ordinary skill in the art may still derive other drawings from these accompanying drawings without creative efforts.

DETAILED DESCRIPTION

Figure 1:
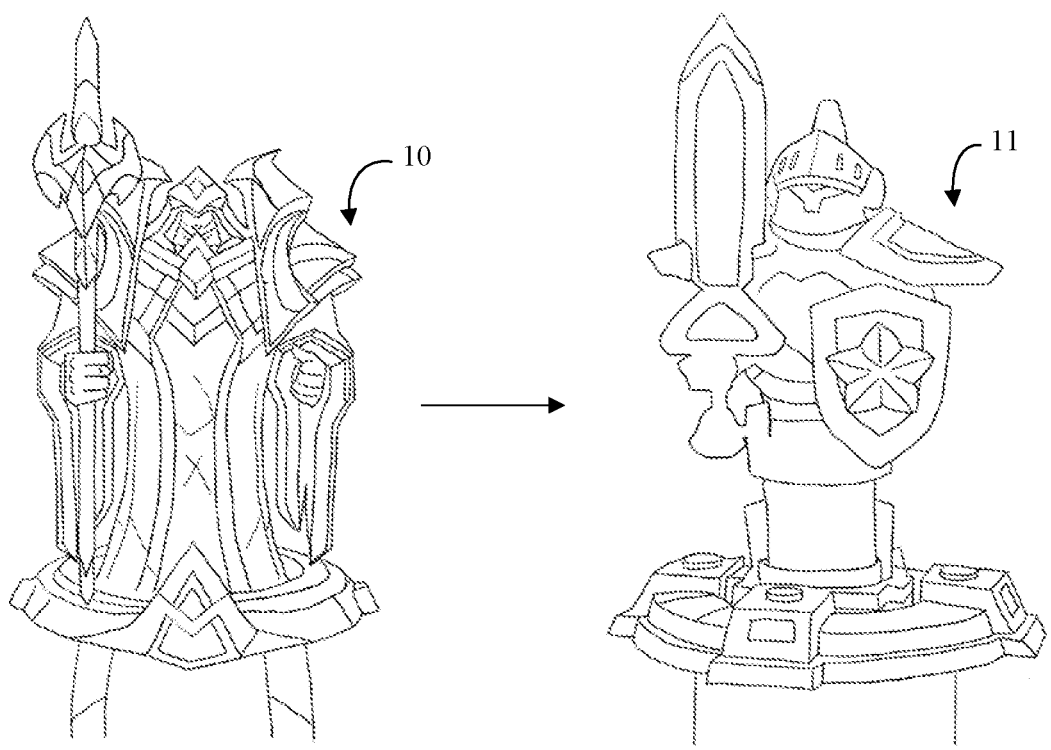
FIG. 1 is a schematic diagram of switching environment elements according to an exemplary embodiment of the disclosure.

To make objectives, technical solutions, and advantages of the disclosure clearer, the following further describes implementations of the disclosure in detail with reference to the accompanying drawings.

First, terms involved in example embodiments of the disclosure are introduced:

Virtual environment is a virtual environment displayed (or provided) when an application is run on a terminal. The virtual environment may be a simulated environment of a real world, or may be a semi-simulated semi-fictional environment, or may be an entirely fictional environment. The virtual environment may be any one of a two-dimensional virtual environment, a 2.5-dimensional virtual environment, and a three-dimensional virtual environment. This is not limited in the disclosure. A description is made by using an example in which the virtual environment is a three-dimensional virtual environment in the following embodiments. In some embodiments, the virtual environment is used for providing a battle environment for at least two virtual objects. The virtual environment includes a lower left corner region and an upper right corner region that are symmetrical. Virtual objects on two opposing camps occupy the regions respectively, and the object of each camp is to destroy a target building, a stronghold, a base, or a Nexus deep in the opponent's region to win victory. Switching of a virtual scene in the embodiments of the disclosure includes, but is not limited to: switching a landform, a building, a stronghold, a base, a Nexus, a virtual unit (for example, a melee soldier or a remote soldier) in the virtual environment, and a light effect in the virtual environment.

Virtual object is a movable object in the virtual environment. The movable object may be a virtual character, a virtual animal, a cartoon character, or the like, for example, a character or an animal displayed in a three-dimensional virtual environment. In some embodiments, the virtual object is a three-dimensional model created based on a skeletal animation technology. Each virtual object has a shape and size in the three-dimensional virtual environment, and occupies some space in the three-dimensional virtual environment. According to the embodiments of the disclosure, for example, the virtual object is a master control virtual object controlled by a user, and the master control virtual object generally refers to one or more virtual objects in the virtual environment.

Skin refers to a virtual item that can be worn on a virtual object. The user can control the virtual object to switch various styles of skins, and the virtual object after switching the skin changes in at least one of the following aspects: an appearance model of the virtual object, an avatar, a voice, a spell casting action, skill performance, an attack action, and an action when a virtual is transmitted a position. According to the embodiments of the disclosure, for example, the changes are included, but are not limited in an actual application A plurality of skins having the same theme form a series of skins. For example, a video game theme skin series, a Star Guardians theme skin series, a Yammy hero skin series, a championship skin series, an anniversary celebration skin series, a Three-Kingdom theme skin series, a Pulsefire skin series, a Guardian of the Sands skin series, a conqueror skin series, a project skin series, a Xianxia skin series, a Redeemed skin series, a Halloween theme skin series, an ice-snow festival theme skin series, and a castle theme skin series. A design style of the same series of skins is related to a theme and even a background of the virtual object using the skin series also has a particular correlation.

Skin Easter egg refers to a mechanism for switching a specified element in a virtual environment by using a skin worn by a virtual object. In the embodiments of the disclosure, for example, a skin configured for a virtual object may trigger an Easter egg. After the skin Easter egg is triggered, a client switches a resource model corresponding to a specified environment element in the virtual environment, for example, switching a resource model corresponding to a Nexus in the virtual environment, switching a resource model corresponding to a turret in the virtual environment, and switching a resource model corresponding to an automatically controlled virtual soldier in each camp.

Multiplayer online battle arena game (MOBA) refers to, in a virtual environment, different virtual teams belonging to at least two hostile camps respectively occupy respective map regions and use a winning condition as a target for competition. The winning condition includes, but is not limited to, at least one of occupying strongholds or destroying hostile camp strongholds, killing virtual objects of the hostile camp, ensuring a respective survival in a specified scene and a specified time, seizing a resource, and exceeding the opponent's score in a specified time. A battle arena game may take place in rounds. The same map or different maps may be used in different rounds of the battle arena game. Each virtual team may include one or more virtual objects, for example, one virtual object, two virtual objects, three virtual objects, or five virtual objects. A duration of a round of the MOBA game is from a time point at which the game starts to a time point at which the winning condition is met.

A method provided in the disclosure is applicable to a virtual reality application, a three-dimensional map application, a military simulation application, a first person shooting (FPS) game, a MOBA game, and the like. An application in a game is used as an example for description in the following embodiments.

A game based on a virtual environment includes maps of one or more game worlds. The virtual environment in the game simulates a scene in the real world. A user may control a virtual object in the game to perform actions in the virtual environment such as walking, running, jumping, shooting, skill casting, changing a skin, being attacked by another virtual object, being damaged in the virtual environment, and attacking another virtual object, which has relatively high interactivity. In addition, a plurality of users may form a team online to perform an arena game. Virtual objects in one camp (one team) may fight against virtual objects in another camp (another team) in the virtual environment.

In some embodiments, the user controls a virtual object to switch a skin worn by the virtual object, the skin worn by the virtual object being used for changing an appearance model of the virtual object, an action when a skill is cast, an action when the virtual object is transmitted to a position in the virtual environment, and the like. Each user can control at least one type of virtual object such as a melee attack virtual object, an auxiliary virtual object, or a remote attack virtual object. The virtual objects in the same camp may wear the same series (or the same style, or same theme) of skins or different series of skins. In some cases, the same series of skins may enhance attack powers of the virtual objects.

The embodiments of the disclosure provide a method for switching a specified environment element in a virtual environment by switching a skin worn by a virtual object.

A plurality of users control a plurality of virtual objects to form the same camp to move in a virtual environment. Before the virtual object enters the virtual environment, the user may autonomously select a skin worn by the virtual object in the virtual environment. After the virtual objects in the camp select skins, the client compares the skin of each virtual object in the camp with skin series in an Easter egg configuration table. The Easter egg configuration table is used for indicating a correspondence between a skin worn by a virtual object and a triggered skin Easter egg. For example, the Easter egg configuration table includes a skin series that can trigger a skin Easter egg, a trigger threshold (that is, how many skins belong to the same series which are needed to trigger the skin Easter egg), and a virtual environment element corresponding to the skin series.

When skins worn by the virtual objects in the same camp belong to a skin series in the Easter egg configuration list, the skins belonging to the skin series are counted. When a quantity of skins meets a trigger threshold of triggering an Easter egg, a specified environment element in the virtual environment is switched according to the skin Easter egg. For example, skins of a Halloween skin series can trigger a stone element in the virtual environment to be changed into a pumpkin element. The client counts skins that are worn by virtual object in a camp and that belong to the Halloween skin series, and if three virtual objects in the camp wear the skins belonging to the Halloween skin series (the trigger threshold is met), a skin Easter egg corresponding to the Halloween skin series is triggered, and the stone element in the virtual environment is switched to the pumpkin element.

As shown in FIG. 1, in some embodiments, the specified environment element in the virtual environment may further includes a turret element 10, the turret element 10 being an appearance displayed when the specified environment element in the virtual environment is not switched. When three virtual objects in the same camp select skins in a skin series a, the client switches the turret element 10 to another turret element 11 at the beginning of battle between camps. A virtual environment picture including the another turret element 11 is displayed on a user interface.

According to the method provided in this embodiment, switching of a specified environment element in a virtual environment is determined by using a skin configured for a virtual object, and switching of a plurality of element types can be implemented.

Figure 2:
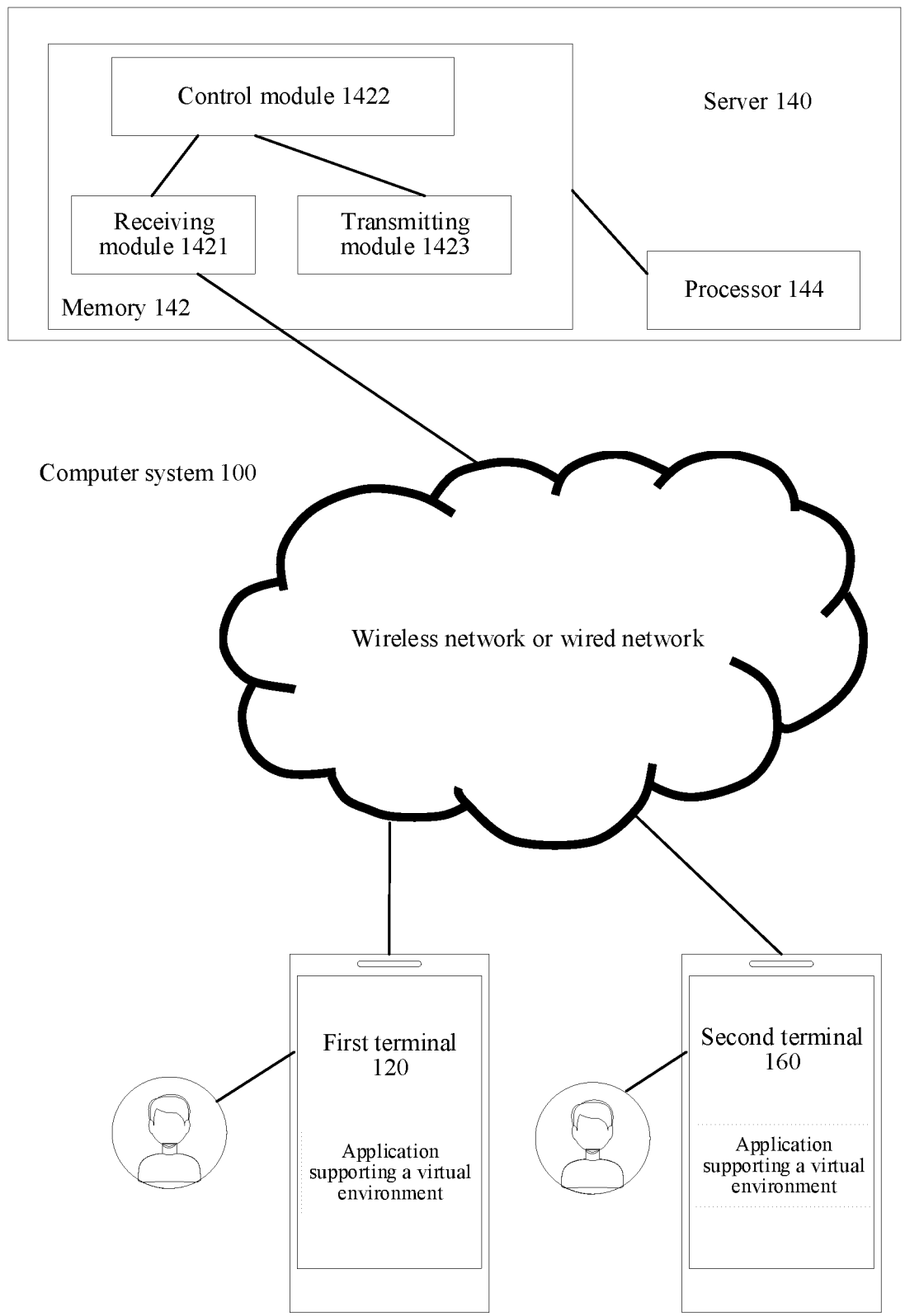
FIG. 2 is a block diagram of a computer system according to an exemplary embodiment of the disclosure.

FIG. 2 is a structural block diagram of a computer system according to an exemplary embodiment of the disclosure. The computer system 100 includes a first terminal 120, a server 140, and a second terminal 160.

An application supporting a virtual environment is installed and run on the first terminal 120. The application may be any one of a virtual reality (VR) application, a three-dimensional map application, a military simulation application, an FPS game, a MOBA game, a multiplayer shooting survival game, a battle royale shooting game, and an augmented reality (AR) application. The first terminal 120 is a terminal used by a first user, the first user uses the first terminal 120 to control a first virtual object in the virtual environment to perform a movement, and the movement includes, but is not limited to, at least one of body posture adjustment, walking, running, skipping, cycling, aiming, picking up, skill casting, changing a skin, and attacking other virtual objects. For example, the first virtual object is a first virtual character such as a simulated character object or a cartoon character object.

The first terminal 120 is connected to the server 140 by using a wireless network or a wired network.

The server 140 includes at least one of one server, a plurality of servers, a cloud computing platform, a virtualization center. For example, the server 140 includes a processor 144 and a memory 142, and the memory 142 further includes a receiving module 1421, a control module 1422, and a transmitting module 1423, the receiving module 1421 being configured to receive a request such as a skin changing request transmitted by the client; the control module 1422 being configured to control rendering of a virtual environment picture; and the transmitting module 1423 being configured to transmit an response to the client, for example, transmit a loading instruction of a resource model to the client. The server 140 is configured to provide a backend service for an application supporting a three-dimensional virtual environment. In some embodiments, the server 140 takes on primary computing work, and the first terminal 120 and the second terminal 160 take on secondary computing work; or the server 140 takes on secondary computing work, and the first terminal 120 and the second terminal 160 take on primary computing work; or collaborative computing is performed by using a distributed computing architecture among the server 140, the first terminal 120, and the second terminal 160.

The server 140 may cause pictures of a plurality of clients to be consistent by using a synchronization technology. For example, the synchronization technology used by the server 140 includes: a state synchronization technology or a frame synchronization technology.

State Synchronization Technology

Figure 3:
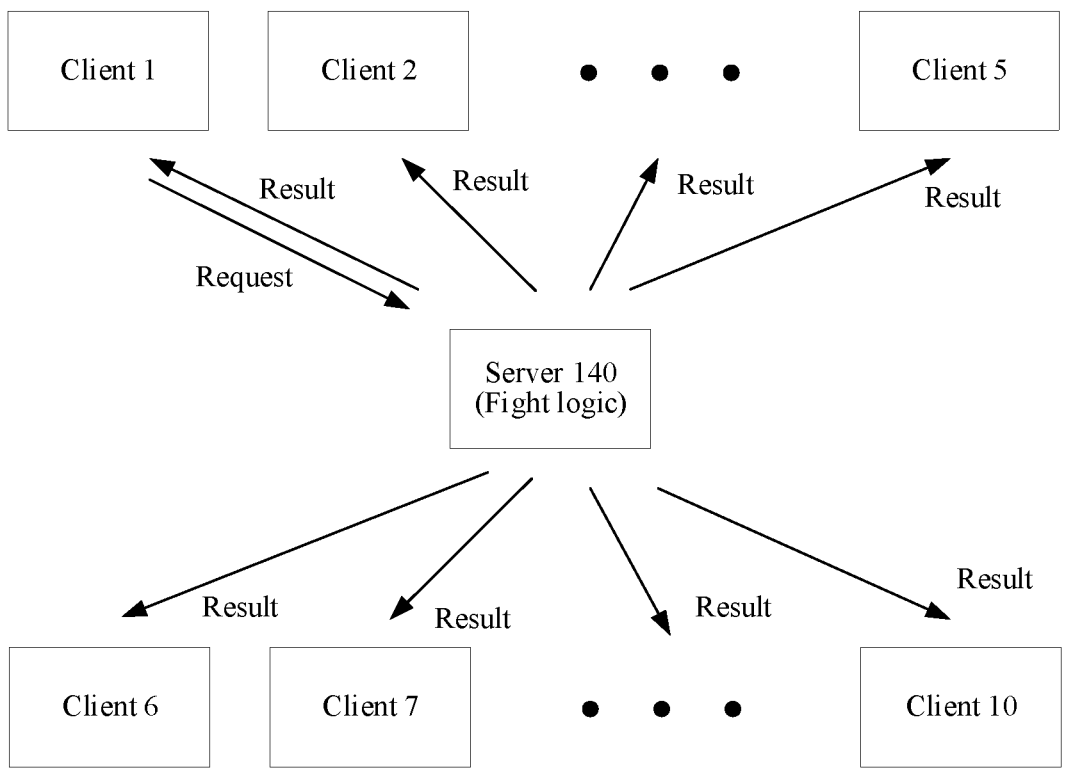
FIG. 3 is a schematic diagram of a state synchronization technology according to an exemplary embodiment of the disclosure.

In the embodiment based on FIG. 2, the server 140 is synchronized with a plurality of clients by using a state synchronization technology. In the state synchronization technology, as shown in FIG. 3, a fight logic is run in the server 140. When a state of a virtual object in a virtual environment changes, the server 140 transmits a state synchronization result to all the clients such as a client 1 to a client 10.

In an exemplary example, when the client 1 transmits a request to the server 140, the request being used for requesting a virtual object 1 to change a skin, the server 140 determines whether the virtual object 1 can perform an operation of changing the skin, and obtains, when the virtual object 1 performs the operation of changing the skin, a switching result of whether to switch a scene in the virtual environment. Subsequently, the server 140 transmits the switching result to all the clients, and all the clients update local data and interface performance according to the switching result.

Frame Synchronization Technology

Figure 4:
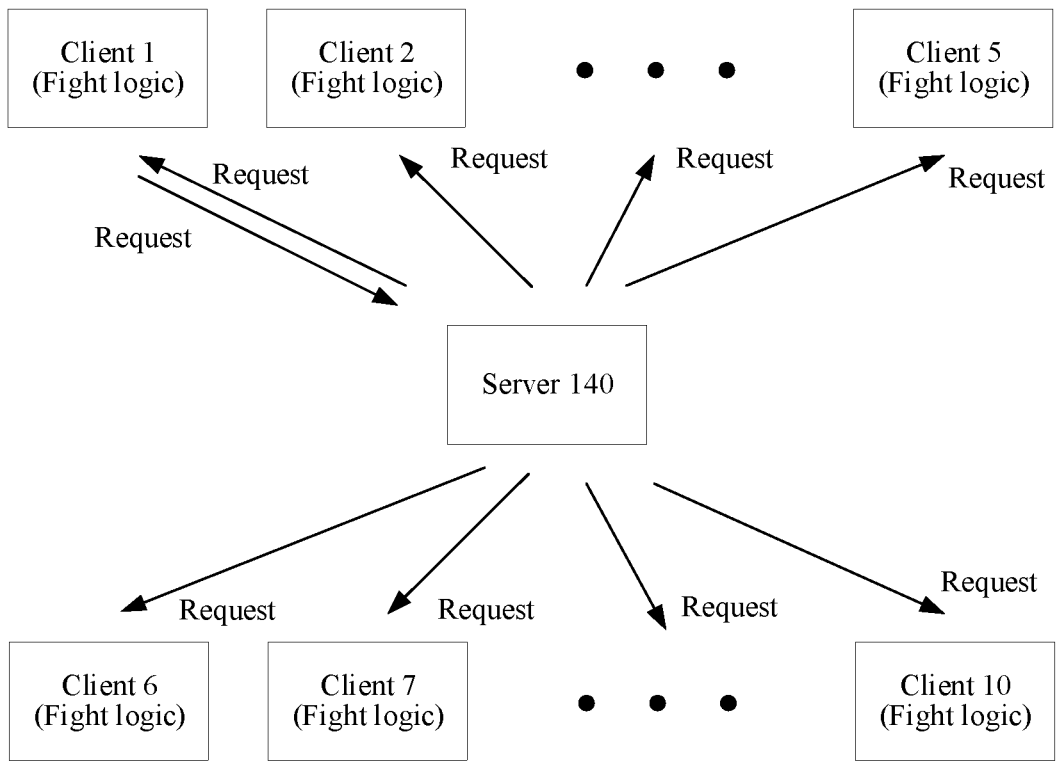
FIG. 4 is a schematic diagram of a frame synchronization technology according to an exemplary embodiment of the disclosure.

In the embodiment based on FIG. 2, the server 140 is synchronized with the plurality of clients by using a frame synchronization technology. In the frame synchronization technology, as shown in FIG. 4, a fight logic is run in each client. Each client transmits a frame synchronization request to the server, the frame synchronization request carrying a local data change of each client. After receiving a frame synchronization request, the server 140 forwards the frame synchronization request to all the clients. After receiving the frame synchronization request, each client processes the frame synchronization request according to the local fight logic and updates local data and interface performance.

An application supporting a virtual environment is installed and run on the second terminal 160. The application may be any one of a VR application, a three-dimensional map application, a military simulation application, an FPS game, a MOBA game, a multiplayer shooting survival game, a battle royale shooting game, and an AR application. The second terminal 160 is a terminal used by a second user, the second user uses the second terminal 160 to control a second virtual object in the virtual environment to perform a movement, and the movement includes, but is not limited to, at least one of body posture adjustment, walking, running, skipping, cycling, aiming, skill casting, changing a skin, picking up, and attacking other virtual objects. For example, the second virtual object is a second virtual character such as a simulated character object or a cartoon character object. For example, the first virtual character object and the second virtual character object belong to the same team. The first virtual character object and the second virtual character object wear skins belonging to the same skin series.

In some embodiments, the first virtual character object and the second virtual character object are located in the same virtual environment. For example, the first virtual character object and the second virtual character object may belong to the same team, the same organization, or the same camp, and have a friend relationship or have a temporary communication permission. In another example, the first virtual character object and the second virtual character object may alternatively belong to different camps, different teams, or different organizations, or have a hostile relationship with each other. The first virtual character object and the second virtual character object wear different skins belonging to the same skin series, or the first virtual character object and the second virtual character object wear skins in different skin series.

In some embodiments, the applications installed on the first terminal 120 and the second terminal 160 are the same, or the applications installed on the two terminals are the same type of applications in different operating system platforms (Android or iOS). The first terminal 120 may be generally one of a plurality of terminals, and the second terminal 160 may be generally one of a plurality of terminals. In this embodiment, only the first terminal 120 and the second terminal 160 are used as an example for description. The first terminal 120 and the second terminal 160 may be the same device type or different device types. The device type includes at least one of a smartphone, a tablet computer, an e-book reader, an MP3 player, an MP4 player, a laptop computer, and a desktop computer. The following embodiment is described by using an example that the terminal includes a smartphone.

A person skilled in the art may learn that there may be more or fewer terminals. For example, there may be one terminal, or there may be dozens of or hundreds of terminals or more. The quantity and the device type of the terminals are not limited in the embodiments of the disclosure.

Figure 5:
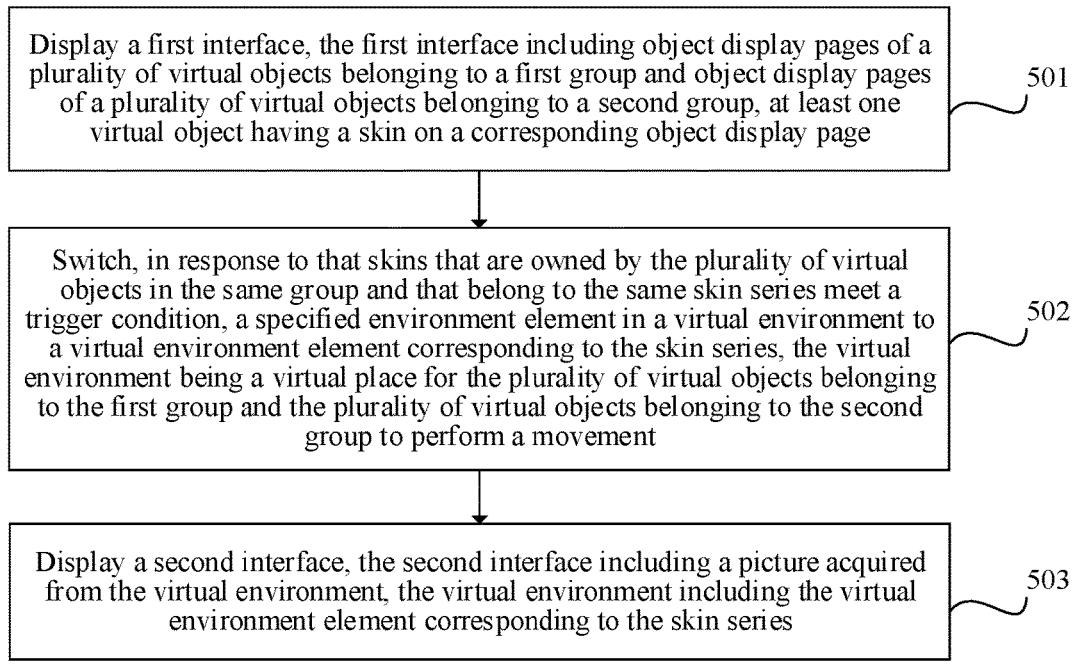
FIG. 5 is a flowchart of a virtual environment display method according to an exemplary embodiment of the disclosure.

FIG. 5 is a flowchart of a virtual environment display method according to an exemplary embodiment of the disclosure. The method is applicable to the first terminal 120 or the second terminal 160 in the computer system 100 shown in FIG. 2 or another terminal in the computer system. The method includes the following steps 501 to 503.

Step 501. Display a first interface, the first interface including object display pages of a plurality of virtual objects belonging to a first group and object display pages of a plurality of virtual objects belonging to a second group, at least one virtual object having a skin on a corresponding object display page.

In this embodiment, the first interface is a round beginning loading interface, and the object display page of the virtual object is an object poster of the virtual object and is used for displaying an appearance and information about the virtual object. The virtual object has a skin refers to the virtual object wears the skin, and the virtual object does not have a skin refers to the virtual object does not wear the skin. The virtual environment includes virtual objects of at least two groups (or referred to as camps), and in this embodiment of the disclosure, virtual objects of a first group (that is, a first camp) and virtual objects of a second group (that is, a second camp) are used as an example for description.

A client supporting a virtual environment is run on a terminal used by a user, and when the user runs the client, an interface when the client is used is correspondingly displayed on a display screen of the terminal. The round beginning loading interface is a corresponding interface displayed when virtual objects that participate in a battle have completed matching before the battle is started, and the round beginning loading interface includes object posters of a plurality of virtual objects belonging to a first camp and object posters of a plurality of virtual objects belonging to a second camp. The user may learn, in the round beginning loading interface, information (for example, a name, an occupation, a level, and a worn skin of a virtual object, and proficiency of the user controlling the virtual object) about a virtual object controlled by another user that participates in the battle. The round beginning loading interface is an interface displayed after the client is started to a normal running state and is different form a resource loading interface displayed when the client is started.

Figure 6:
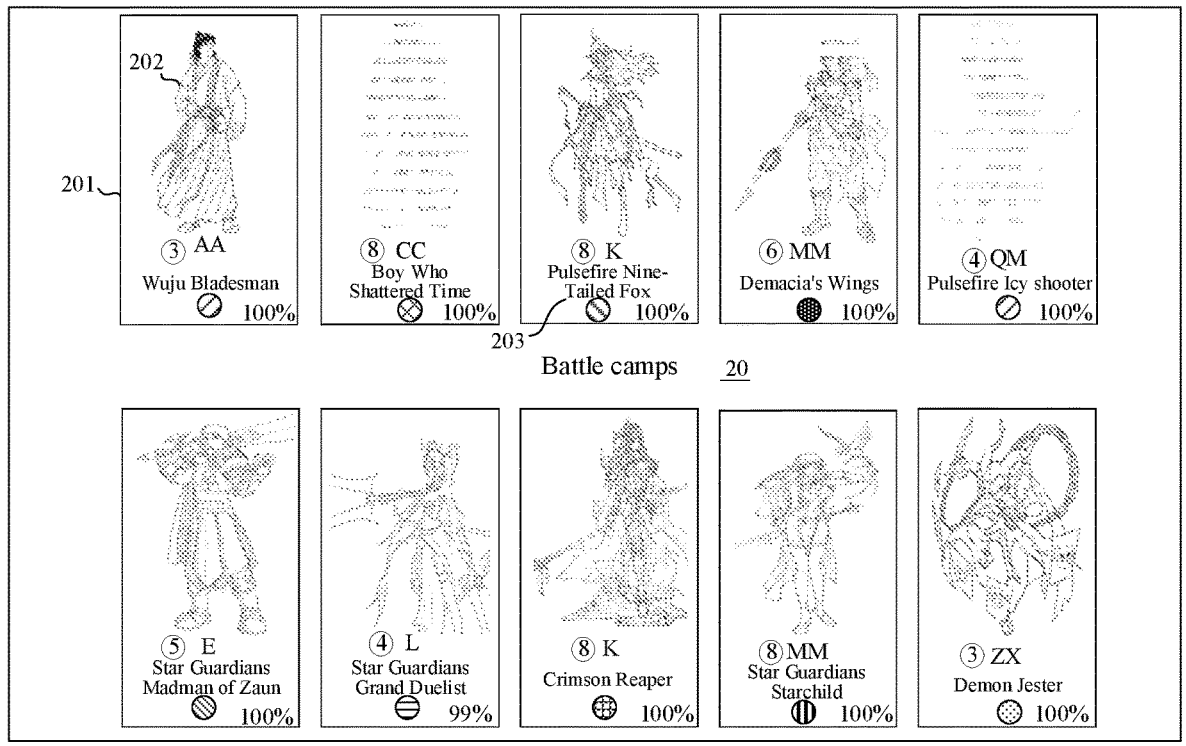
FIG. 6 is a schematic interface diagram of a round beginning loading interface according to an exemplary embodiment of the disclosure.

In some embodiments, before starting a battle, the user needs to be matched with another virtual object that participates in the battle, and a round beginning loading interface shown in FIG. 6 is displayed after the matching succeeds. The round beginning loading interface includes object posters of a plurality of virtual objects belonging to a first camp and object posters of a plurality of virtual objects belonging to a second camp and is used for informing the user of information about a virtual object controlled by another user that participates in the battle.

As shown in FIG. 6, two camps that participate in a battle are displayed in a round beginning loading interface 20, a first row of virtual objects in the round beginning loading interface 20 belongs to a first camp, and a second row of virtual objects in the round beginning loading interface 20 belongs to a second camp. The first virtual object in the first camp is used as an example, and an object poster 201 of the virtual object is displayed on the round beginning loading interface 20. The object poster 201 includes an appearance 202 of the virtual object and information (the information includes at least one of a role type of the virtual object, a level of the virtual object, a nickname of the user in an application, a name of the virtual object, proficiency of the user controlling the virtual object, and a skill of the virtual object) about the virtual object. Whether the virtual object wears a skin or what skin is worn is autonomously selected by the user. In some embodiments, if the user does not choose to wear a skin for a virtual object, the appearance 202 of the virtual object is an appearance without a skin. In some other embodiments, the user chooses to wear a skin for the virtual object, the appearance 202 of the virtual object is an appearance with a skin, that is, the skin worn by the virtual object can be directly observed by the user.

The skin refers to a virtual item that can be worn on a virtual object, and may further includes a virtual item carried by the virtual object, for example, clothing (a jacket, trousers, or the like), shoes, an accessory (earrings, gloves, or the like), a headwear (a crown, a hair band, or the like), a weapon (for example, a knife, a gun, a sword, or a halberd) used by the virtual object, a follow pet or sprite of the virtual object, or a mount (for example, a dragon, a horse, or a pig) of the virtual object. In another example, if the virtual object is a virtual object that can perform a magic in a virtual environment, the virtual object carries a magic stick, and an appearance of the magic stick also changes as the virtual object changes a skin.

In some embodiments, the appearance 202 of the virtual object displayed on the round beginning loading interface 20 is an appearance without a skin, and information 203 about a skin worn by the virtual object is displayed in the object poster 201, that is, the skin worn by the virtual object is represented by text information. For example, the information 203 "Pulsefire Nine-Tailed Fox", "Pulsefire" refers to a skin worn by a virtual object, and "Nine-Tailed Fox" refers to a name of the virtual object used by the user. An expression manner of the skin worn by the virtual object is not limited in this embodiment of the disclosure.

In some embodiments, after the round beginning loading interface 20 is displayed continuously for a period of time (for example, 10 s), the interface displayed on the terminal is switched to a user interface including a virtual environment picture.

The virtual object is a movable object in the virtual environment, and the virtual object may be a virtual character, a virtual animal, a cartoon character, or the like. In this embodiment of the disclosure, virtual objects correspond to different occupations, virtual objects of different occupations wear different skins, virtual objects of different occupations cast different skills in the virtual environment, and a virtual object of the same occupation can cast a plurality of types of skills.

Step 502. Switch, if skins that are owned by the plurality of virtual objects in the same group and that belong to the same skin series meet a trigger condition, a specified environment element in a virtual environment to a virtual environment element corresponding to the skin series, the virtual environment being a virtual place for the plurality of virtual objects belonging to the first group and the plurality of virtual objects belonging to the second group to perform a movement.

In this embodiment, virtual objects in the same camp are manually established by the user or are randomly matched by the client. A plurality of virtual objects belonging to a first camp and a plurality of virtual objects belonging to a second camp perform a battle arena game in a virtual environment.

Each virtual object has one or more sets of skins, the one or more sets of skins belonging to the same skin series or belonging to different skin series. A plurality of skins having the same theme or having the same style form a series of skins. For example, a Halloween theme skin series, a castle theme skin series, a constellation theme skin series, and a metal theme skin series.

The virtual environment element may include at least one of a virtual unit moving as the virtual object, a virtual unit in the virtual environment, voice broadcast information corresponding to the virtual object, and a background music played in the virtual environment. The virtual environment elements are in one-to-one correspondence with the specified environment elements.

The trigger condition includes at least one of the following conditions: a condition related to a quantity of skins worn by the virtual objects, a condition related to types of skins worn by the virtual objects, and a condition related to a combination manner (matching relationship) of skins worn by the virtual objects.

For example, if a quantity of skins that are worn by the plurality of virtual objects in the same camp and that belong to the same skin series reaches a trigger threshold, the specified environment element in the virtual environment is switched to the virtual environment element corresponding to the skin series.

In an example, the same camp includes five virtual objects. When skins worn by three virtual objects belong to the Halloween theme skin series, the client may switch a stone element in the virtual environment to a pumpkin element corresponding to the Halloween theme skin series.

For example, if types of skins worn by the virtual objects in the same camp belong to a specified skin type, the specified environment element in the virtual environment is switched to a virtual environment element corresponding to the specified skin type.

In an example, when the types of the skins worn by the virtual objects in the same camp belong to a Saint Seiya type (the specified skin type), the client may switch a building element in the virtual environment to an element corresponding to Saint Seiya. For example, a turret is switched to a gold turret.

In some embodiments, when types of skins worn by the virtual objects in the same camp belong to a specified skin type, the specified environment element in the virtual environment is switched to a virtual environment element corresponding to the specified skin type. In some other embodiments, when a quantity of virtual objects that wear skins belonging to the specified skin type in the same camp exceeds a preset threshold, the specified environment element in the virtual environment is switched to a virtual environment element corresponding specified skin type.

For example, if skins worn by the virtual objects in the same camp meet a specified matching, the specified environment element in the virtual environment is switched to a virtual environment element corresponding to the specified matching.

In an example, when three virtual objects in the same camp respectively wear skins representing "Gold, Wood, Water", which meet a five-element matching, the client may switch a turret element in the virtual environment to a turret element corresponding to the specified matching. For example, the turret after the switching has a sign of Taiji-Bagua.

In an example, when three virtual objects in the same camp respectively wear skins representing "Water, Wood, Earth", which meet a five-element matching (the specified matching), the client may switch a plant element in the virtual environment to a plant element corresponding to the specified matching. For example, an aspen element in the virtual environment is switched to a bamboo element.

In an example, when five virtual objects in the same camp respectively wear skins representing "Gold, Wood, Water, Fire, Earth", which meet the five-element matching (the specified matching), the client may switch a building element in the virtual environment to a virtual environment element corresponding to the specified matching. The client may switch a plant element to the virtual environment element corresponding to the specified matching; the client may switch a river element in the virtual environment to the virtual environment element corresponding to the specified matching; the client may switch a weather element in the virtual environment to the virtual environment element corresponding to the specified matching; and the client may switch a ground element in the virtual environment to the virtual environment element corresponding to the specified matching. For example, a color and a material of the ground are changed, a color of a river is changed, and a color and a shape of the leaves are changed.

Step 503. Display a second interface, the second interface including a picture acquired from the virtual environment, the virtual environment including the virtual environment element corresponding to the skin series.

In this embodiment, the second interface is a battle interface. The battle interface is an interface after a battle is started, that is, an interface after a virtual object enters the virtual environment, and virtual objects of at least two camps perform a battle in the virtual environment. The picture acquired from the virtual environment is a picture obtained by observing the virtual environment from a perspective of a virtual object controlled by the user. In this case, the specified environment element in the virtual environment has been switched to the virtual environment element corresponding to the skin series worn by the virtual objects.

In some embodiments, a user interface (UI) control element superimposed on a virtual environment picture on the battle interface also corresponds to the skin series. For example, a skin worn by a virtual object belongs to a Halloween theme skin series, the UI control element on the battle interface is also switched to an element (including, but is not limited to, a wry face element, a pumpkin element, a cross element, or the like) related to the Halloween.

The perspective is an observation angle for observation from a first-person perspective or a third-person perspective of the virtual object in the virtual environment.

The virtual environment is a virtual environment having any boundary shape, for example, a rhombic virtual environment. The user may browse a full or specified region of the virtual environment by viewing a map corresponding to the virtual environment. A camera model is provided in the virtual environment, and the camera model is used for observing the virtual environment from different perspectives to obtain virtual environment pictures.

In some embodiments, the camera model automatically follows a virtual object in the virtual environment. That is, when a position of the virtual object in the virtual environment changes, a position of the camera model following the virtual object in the virtual environment changes simultaneously, and the camera model is always within a preset distance range from the virtual object in the virtual environment. In an automatic following process, relative positions of the camera model and the virtual object change or do not change.

The camera model is a three-dimensional model located around the virtual object in the virtual environment. When a first-person perspective is adopted, the camera model is located near a head of the virtual object or at a head of the virtual object. When a third-person perspective is adopted, the camera model may be located behind the virtual object and bound to the virtual object, or may be located at any position at a preset distance from the virtual object. The virtual object located in the virtual environment may be observed from different angles through the camera model. In some embodiments, when the third-person perspective is a first-person over-shoulder perspective, the camera model is located behind the virtual object (for example, the head and the shoulders of the virtual character). In addition to the first-person perspective and the third-person perspective, the perspective further includes another perspective such as a top perspective. When the top perspective is used, the camera model may be located above the head of the virtual object. The top perspective is a perspective for observing the virtual environment at an angle from the air. In some embodiments, the camera model is not actually displayed in the virtual environment. In other words, the camera model is not displayed in the virtual environment picture displayed in the UI.

A description is made by using an example in which the camera model is located at any position away from the virtual object by a preset distance. One virtual object corresponds to one camera model, and the camera model may rotate with the virtual object as a rotation center, for example, the camera model is rotated with any point of the virtual object as the rotation center. During rotation, the camera model is not only rotated by an angle, but also displaced. During rotation, a distance between the camera model and the rotation center remains unchanged, that is, the camera model is rotated on a surface of a sphere with the rotation center as a sphere center. Any point of the virtual object may be the head or the torso of the virtual object, or any point around the virtual object. This is not limited in the embodiments of the disclosure. when the camera model observes the virtual object, a center of the perspective of the camera model points to a direction from a point on the spherical surface at which the camera model is located to the sphere center.

The camera model may alternatively observe the virtual object at a preset angle in different directions of the virtual object.

Figure 7:
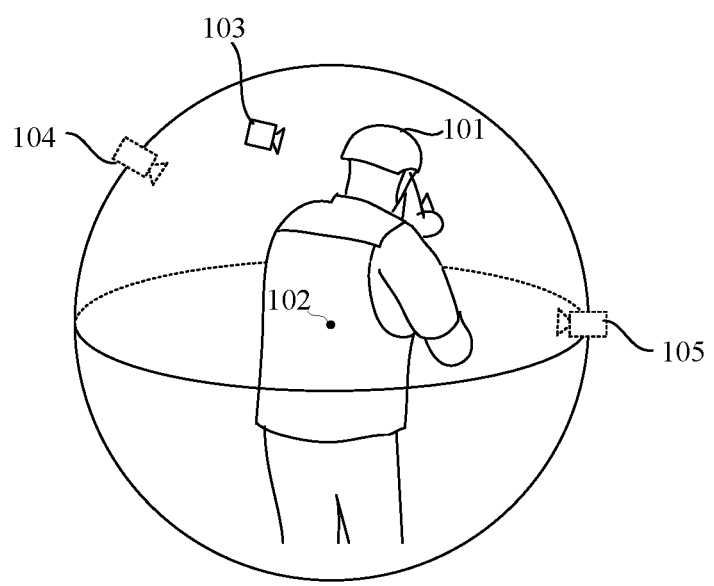
FIG. 7 is a schematic diagram of a camera model corresponding to a perspective of a virtual object according to an exemplary embodiment of the disclosure.

For example, referring to FIG. 7, a point in a virtual object 101 is determined as a rotation center 102, and the camera model rotates around the rotation center 102. In some embodiments, the camera model is configured with an initial position, and the initial position is an upper rear position of the virtual object (for example, a rear position of the brain). For example, as shown in FIG. 7, the initial position is a position 103, and when the camera model rotates to a position 104 or a position 105, a direction of a perspective of the camera model changes as the camera model rotates.

In some embodiments, the perspective of the camera model may be switched through a manual operation of the user. For example, the user selects a target that is desired to view on a map corresponding to the virtual environment, the camera model switches, according to the operation of the user, the perspective to a perspective corresponding to the target selected by the user, the target selected by the user is displayed on a virtual environment picture under the perspective, and a virtual object controlled by the user is not displayed.

In summary, according to the method provided in this embodiment, a relationship between a skin worn by a virtual object and switching of a specified environment element in a virtual environment is established, and when skins that are worn by a plurality of virtual objects in the same camp and that belong to the same skin series meet a trigger condition, the specified environment element in the virtual environment is automatically switched to a virtual environment element corresponding to the skin series. Switching of a corresponding environment element is automatically triggered according to skins that are worn by the virtual objects and that belong to different skin series, so that scene switching of the virtual environment is no longer limited to several fixed scenes provided by a system, and more scene types are provided for scene switching of the virtual environment, thereby improving a matching degree between the virtual object and the environment element, implementing personalized display of the virtual environment, and obtaining a good display effect.

Figure 8:
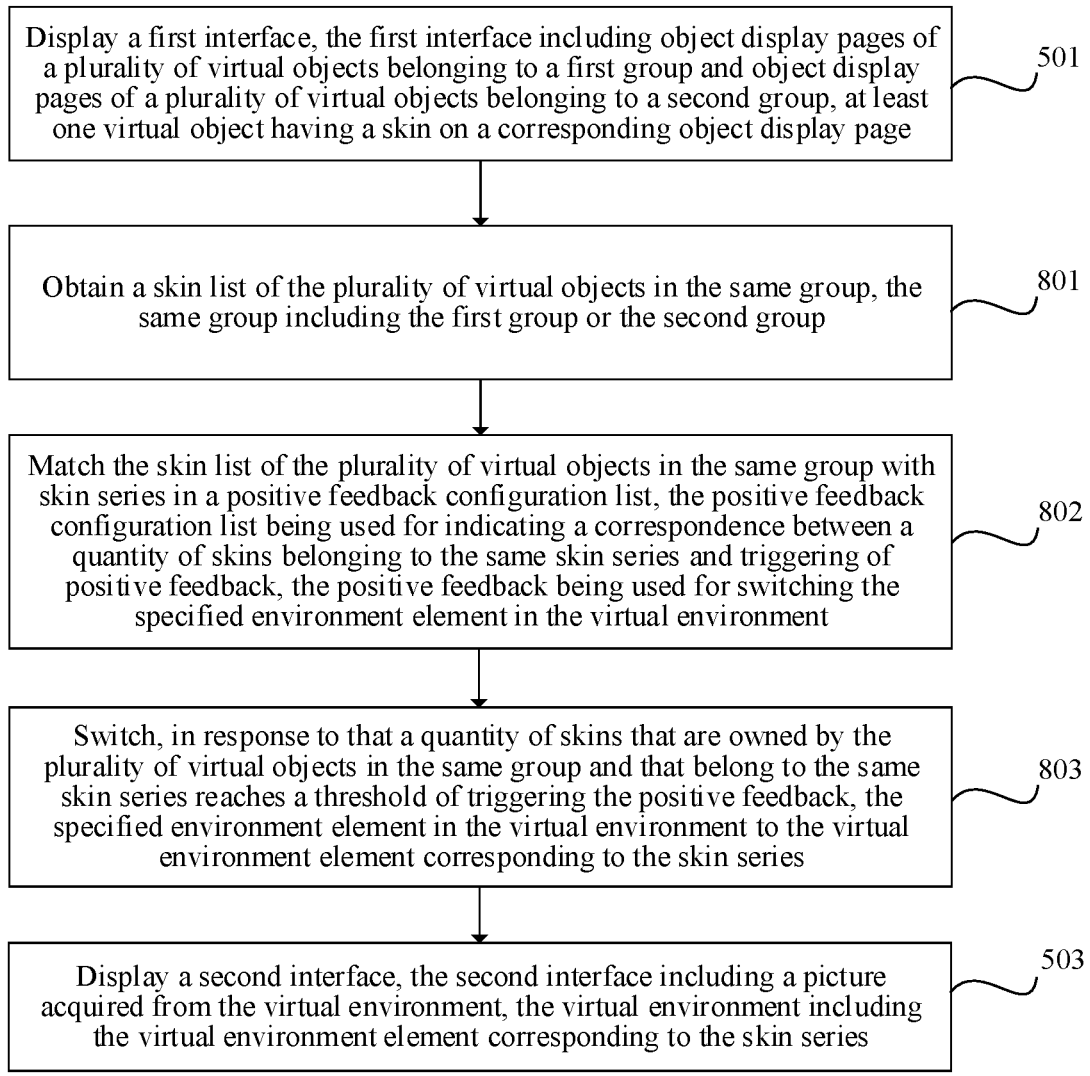
FIG. 8 is a flowchart of a virtual environment display method according to another exemplary embodiment of the disclosure.

Based on the embodiment shown in FIG. 5, the virtual environment display method is described by using an example in which the trigger condition includes a condition related to a quantity of skins worn by the virtual objects, as shown in FIG. 8. The method is applicable to the first terminal 120 or the second terminal 160 in the computer system 100 shown in FIG. 2 or another terminal in the computer system.

Step 502 may include the following steps 801 to 803.

Step 801. Obtain a skin list of the plurality of virtual objects in the same group, the same group including the first group or the second group.

Before two groups (that is, two camps) perform a battle, the client obtains skin lists worn by virtual objects in the two camps. Table 1 represents skin lists corresponding to virtual objects in two camps.

TABLE 1

| Camps | | Skins | Skin series |
|---|---|---|---|
| First camp | Virtual object a | Skin 1 | Halloween theme skin series |
| | Virtual object b | Skin 2 | Halloween theme skin series |
| | Virtual object c | Skin 4 | Christmas theme skin series |
| | Virtual object d | Skin 6 | Christmas theme skin series |
| | Virtual object e | Skin 3 | Halloween theme skin series |
| Second camp | Virtual object A | Skin 10 | Constellation skin series |
| | Virtual object B | Skin 3 | Halloween theme skin series |
| | Virtual object C | Skin 7 | Robot skin series |

TABLE 1-continued

| Camps | Skins | Skin series |
|---|---|---|
| Virtual object D | Skin 8 | Robot skin series |
| Virtual object E | Skin 9 | Robot skin series |

For example, a skin worn by a virtual object has a skin identity (ID), for example, a skin 1 is used for uniquely identifying the skin. A skin series to which the skin belongs has a skin series ID. Types of the skin ID and the skin series ID are not limited in this embodiment of the disclosure.

Step 802. Match the skin list of the plurality of virtual objects in the same group with skin series in a positive feedback configuration list, the positive feedback configuration list being used for indicating a correspondence between a quantity of skins belonging to the same skin series and triggering of positive feedback, the positive feedback being used for switching the specified environment element in the virtual environment.

In this embodiment, the positive feedback may be a skin Easter egg and refers to a mechanism for switching a specified environment element in a virtual environment by using a skin worn by a virtual object. After a skin Easter egg is triggered, the client switches an environment element corresponding to the skin Easter egg in the virtual environment to a virtual environment element corresponding to a skin series.

For example, Table 2 represents an Easter egg configuration list.

TABLE 2

| Skins | Skin series | Skin Easter eggs | Trigger threshold | Priority | Resource paths |
|---|---|---|---|---|---|
| Skin 1, Skin 2, Skin 3 | Halloween theme skin series | Skin Easter egg 1: switching a plant element in the virtual environment | A quantity of skins belonging to the Halloween theme skin series in the same camp is 3 | Skin Easter egg 3 > Skin Easter egg 2 > Skin Easter egg 1 | Path 1 |
| Skin 4, Skin 5, Skin 6 | Christmas theme skin series | Skin Easter egg 2: switching a building element in the virtual environment | A quantity of skins belonging to the Christmas theme skin series in the same camp is 2 | | Path 4 |
| Skin 7, Skin 8, Skin 9 | Robot skin series | Skin Easter egg 3: switching a virtual unit (for example, a turret or a Nexus) in the virtual environment | A quantity of skins belonging to the Robot skin series in the same camp is 5 | | Path 7 |

Skins worn by a plurality of virtual objects in the same camp are compared with skins covered by skin series in a skin Easter egg configuration list one by one. When a skin worn by a virtual object belongs to a skin series in the Easter egg configuration list, the skin series is increased by 1, a quantity of skins that are worn by the virtual objects and that belong to the same skin series is counted finally, and a triggered skin Easter egg is determined according to the quantity.

Step 803. Switch, in response that a quantity of skins that are worn by the plurality of virtual objects in the same group and that belong to the same skin series reaches a threshold of triggering the positive feedback, the specified environment element in the virtual environment to the virtual environment element corresponding to the skin series.

In an example, when skins worn by virtual objects in the same camp are the skin 1, the skin 2, and the skin 3, and virtual objects in another camp do not wear skins, the skin Easter egg 1 is triggered, and the client switches the plant element (for example, tree or grass) in the virtual environment to an element such as a pumpkin element, a cross element, or a wry face element related to the Halloween theme skin series.

In an example, when skins worn by the virtual objects in the same camp trigger two skin Easter eggs such as the skin Easter egg 1 and the skin Easter egg 2 at the same time, the skin Easter egg 2 is preferentially triggered according to priorities of the skin Easter eggs. That is, the client switches the building element in the virtual environment to a virtual environment element corresponding to the Christmas theme skin series, for example, a Christmas tree element, a Christmas elder element, or an elk element.

In this embodiment, step 803 may include the following steps 8031 to 8034 (not shown in the figure):

Step 8031. Obtain, if the quantity of skins that are owned by the plurality of virtual objects in the same group and that belong to the same skin series reaches the threshold of triggering the positive feedback, a second resource path of the virtual environment element corresponding to the skin series from the positive feedback configuration list.

When switching the specified environment element in the virtual environment to the virtual environment element corresponding to the skin series, the client needs to obtain a resource path, that is, a second resource path of the virtual environment element corresponding to the skin series. The resource path is a path representing resource storage corresponding to the virtual environment element, and a corresponding resource may be searched for according to the resource path.

Step 8032. Switch a first resource path corresponding to the specified environment element to the second resource path.

The virtual environment element includes at least one of an automatically controlled virtual role (for example, a virtual soldier, a melee soldier element, or a gun carrier element) a neutral role (for example, a neutral creature, which refers to a wild monster that does not belong to any camp) that does not belong to any group in the virtual environment, a virtual decoration unit, a virtual map element (a map element corresponding to the virtual environment), a background music element (for example, a music played when a virtual object moves in the virtual environment), a voice broadcast element (for example, broadcasting a result in which a virtual object kills another virtual object), a control broadcast element, an interface control element, and a back-to-city effect element (an effect in which a virtual object is transmitted to a stronghold of a camp of the virtual object). The specified environment elements are in one-to-one correspondence with the virtual environment elements.

Step 8033. Load the virtual environment element corresponding to the skin series according to the second resource path.

For example, as shown in Table 2, the client loads a virtual environment element corresponding to the Christmas theme skin series according to the path 4.

Step 8034. Switch the specified environment element to the virtual environment element corresponding to the skin series.

For example, the building element in the virtual environment is switched to a loaded virtual environment element corresponding to the Christmas theme skin series.

In summary, according to the method provided in this embodiment, skins worn by virtual objects are associated with a triggered skin Easter egg in an Easter egg configuration list. When a quantity of skins that are worn by the virtual objects and that belong to the same skin series reaches a threshold of triggering a skin Easter egg, a specified environment element in a virtual environment is automatically switched to an environment element corresponding to the skin series. Switching of a corresponding environment element is automatically triggered according to skins that are worn by the virtual objects and that belong to different skin series, so that scene switching of the virtual environment is no longer limited to several fixed scenes provided by a system, and more scene types are provided for scene switching of the virtual environment, thereby improving a matching degree between the virtual object and the environment element, implementing personalized display of the virtual environment, and obtaining a good display effect.

A first resource path is switched to a second resource path, so that a virtual environment element corresponding to the skin series is loaded according to the second resource path after the switching, to complete an environment element switching process, thereby ensuring accuracy of the environment element switching.

It may be understood that the manner of determining to trigger the skin Easter egg according to a quantity of skins and the manner of triggering the skin Easter egg according to the priority may be separately implemented, or may be implemented in a combination, or may be implemented in another combination.

Figure 9:
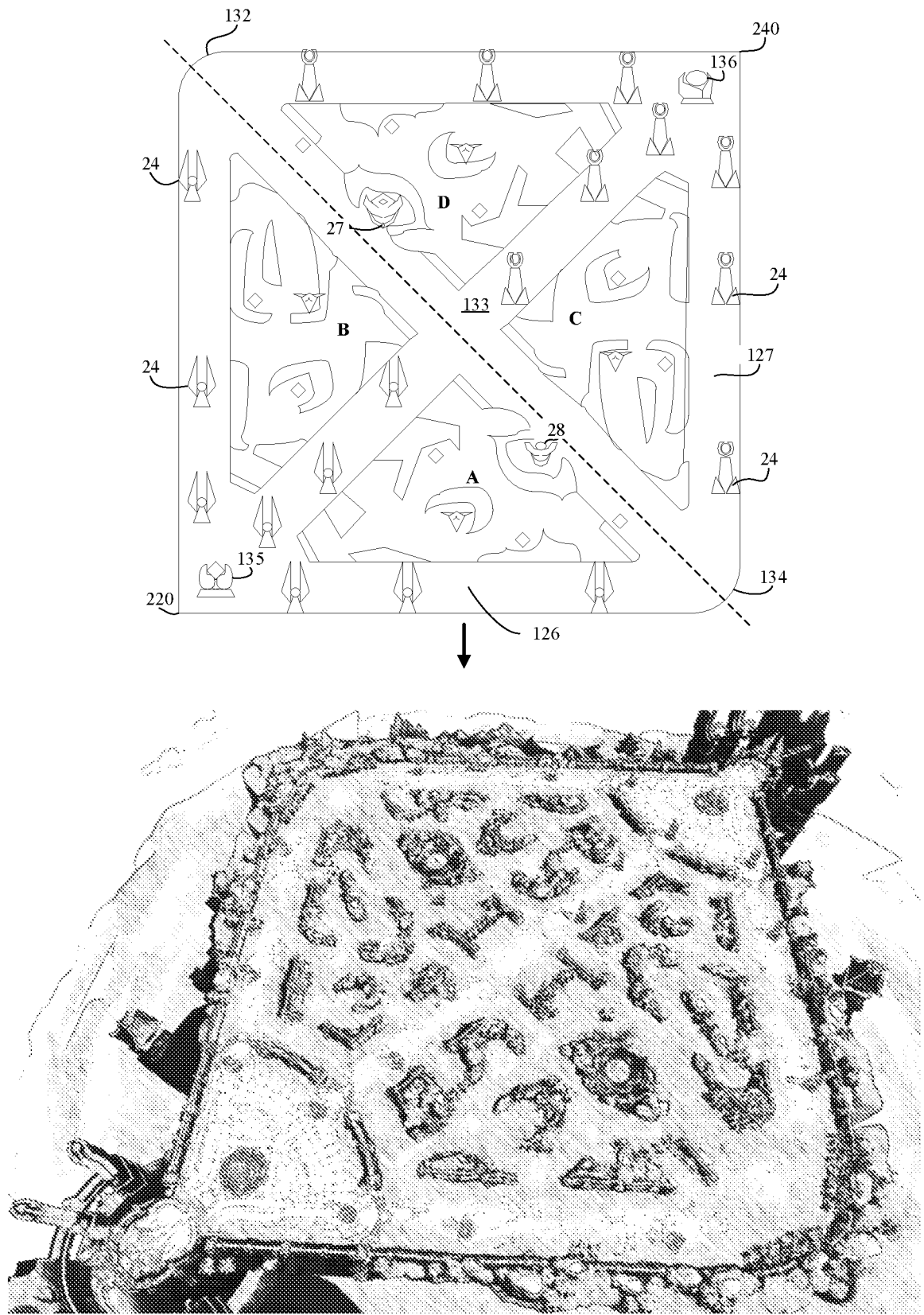
FIG. 9 is a schematic diagram of a mirror virtual world of a typical multiplayer online battle arena (MOBA) game according to an exemplary embodiment of the disclosure.

FIG. 9 is a schematic diagram of a virtual world of a MOBA game according to an exemplary embodiment of the disclosure. The virtual world is a square, for example, the virtual world may be in any shape. The virtual world is divided into a lower left triangular region 220 and an upper right triangular region 240 along a middle lane diagonal line. There are three routes from a lower left corner of the lower left triangular region 220 to an upper right corner of the upper right triangular region 240: a first side lane 132, a middle lane 133, and a second side lane 134.

The second side lane 134 includes a first lane section 126 and a second lane section 127, the first lane section 126 being a lane section close to a first camp (a first base 135) in the second side lane, and the second lane section 127 being a lane section close to a second camp (a second base 136) in the second side lane. For example, the first lane section 126 has a turret belonging to the first camp, and the second lane section 127 has a turret belonging to the second camp.

In a typical battle, 10 virtual characters need to be divided into two camps for competition. Five virtual roles in a first camp occupy the lower left triangular region 220, and five virtual roles in a second camp occupy the upper right triangular region 240. The first camp uses destroying or occupying of some or all bases of the second camp as a winning condition, and the second camp uses destroying or occupying of some or all bases of the first camp as a winning condition.

For example, the bases of the first camp include nine turrets 24 and the first base 135. The nine turrets 24 are distributed in the first side lane 132, the middle lane 133, and the second side lane 134, and each side lane has three turrets; and the first base 135 is located on the lower left corner of the lower left triangular region 220.

For example, the bases of the second camp include nine turrets 24 and the second base 136. The nine turrets 24 are distributed in the first side lane 132, the middle lane 133, and the second side lane 134, and each side lane has three turrets; and the second base 136 is located on the upper right corner of the upper right triangular region 240.

A position in which a dashed line is located in FIG. 9 may be referred to as a river channel region. The river channel region is a common region of the first camp and the second camp and is also a border region of the lower left triangular region 220 and the upper right triangular region 240.

The MOBA game may require each virtual role to obtain resources from the virtual world, to improve a combat power of the virtual role. The resources include:

1. Creeps periodically appear on the first side lane 132, the middle lane 133, and the second side lane 134, when a creep is killed, a virtual role near the creep obtains experience and gold coins.

2. Four triangular regions A, B, C, and D (or referred to as four jungles) may be divided by using the middle lane (a diagonal line from the lower left to the upper right) and the river channel region (a diagonal line from the upper left to the lower right) as dividing lines, monsters are refreshed periodically in the four triangular regions A, B, C, and D, and when a monster is killed, a virtual role near the monster obtains experience, gold coins, and a BUFF effect.

3. There are periodically refreshed big dragons 27 and small dragons 28 in two symmetrical positions in the river channel region. When the big dragon 27 and the small dragon 28 are killed, all virtual roles in a killer camp obtain experience, gold coins, and a BUFF effect. The big dragon 27 may be referred to as "Baron Nashor" or another name, and the big dragon 28 may be referred to as "Drake", "Ocean Drake", "Infernal Drake", "Mountain Drake", "Cloud Drake", or another name.

In an example, each of the upper and lower channels has a gold coin monster, which appears at 30 seconds after a battle is started. Gold coins are obtained after the gold coin monsters are killed, and the gold coin monsters are refreshed every 70 seconds.

Region A: There is one red BUFF, two ordinary monsters (a wolf and a stone man), and one drake (small dragon) of a random attribute. The red BUFF and the wolf appear at 1 minute 38 seconds after the battle is started, the stone man appears at 1 minute 50 seconds, the ordinary monsters are refreshed every 100 seconds after being killed, and the red BUFF is refreshed every 5 minutes after being killed.

The drake of the random attribute appears at 2 minutes 30 seconds after the battle is started and is refreshed every 6 minutes after being killed, and the whole team obtains gold coins and experience after the drake is killed.

Region B: There is one blue BUFF and two ordinary monsters (a frog and a bird), the blue BUFF and the bird also appear at 1 minute 38 seconds after the battle is started, and the frog appears at 1 minute 50 seconds and is refreshed every 5 minutes after being killed.

Region C: The region C is the same as the region B and has two ordinary monsters (a frog and a bird), and similarly, a blue BUFF also appears at 1 minute 38 seconds and is refreshed every 100 seconds.

Region D: The region D is similar to the region A and has one red BUFF and two ordinary monsters (a wolf and a stone man), and the red BUFF increases output and performs deceleration. There is further a Baron Nashor (a big dragon). The Baron Nashor appears at 20 minutes after the battle is started and is refreshed every 5 minutes after being killed.

In an exemplary example, detailed description is provided for BUFFs.

The red BUFF: lasts for 70 seconds, and the attack has continuous burning damage and deceleration The blue BUFF: lasts for 70 seconds, may shorten a cooling time and help to recover mana additionally every second.

The combat powers of 10 virtual object includes two parts: a level and equipment, the level is obtained by using accumulated empirical values, and the equipment is purchased by using accumulated gold coins. The 10 virtual objects may be obtained by matching 10 user accounts online by a server. For example, the server online matches 2 or 6 or 10 user accounts in an interface for competition in the same virtual world. The 2 or 6 or 10 virtual objects belong to two opposing camps respectively, and quantities of virtual objects corresponding to the two camp are the same. For example, each camp has five virtual objects, and the division of the five virtual objects may be: an attack damage, an assassin, an ability power carry, a tank/a support, and an attack damage carry.

The battle may take place in rounds. The same map or different maps may be used in different rounds of battle. Each camp includes one or more virtual objects, for example, one virtual object, three virtual objects, or five virtual objects.

The switching of an environment element is described with reference to a user interface.

For example, that a quantity of skins meets a threshold is used as a trigger condition to be applied to at least one camp that participates in a battle.

1. If a quantity of skins that are owned (worn) by a plurality of virtual objects in a first group (that is, a first camp) and that belong to a first skin series reaches a first threshold, a first specified environment element in a virtual environment is switched to a first virtual environment element corresponding to the first skin series.

The virtual environment includes a first map region owned by the first group (that is, the first camp), and the first specified environment element is a virtual environment element belonging to the first map region. As shown in FIG. 9, the first map region is the lower left triangular region 220, and the first specified environment element includes the turret element 24 and the first base 135.

2. If a quantity of skins that are owned (worn) by a plurality of virtual objects in the second group (that is, the second camp) and that belong to a second skin series reaches a second threshold, a second specified environment element in the virtual environment is switched to a second virtual environment element corresponding to the second skin series.

The virtual environment includes a second map region owned by the second group (that is, the second camp), and the second specified environment element is a virtual environment element belonging to the second map region. As shown in FIG. 9, the second map region is the upper right triangular region 240, and the second specified environment element includes the turret element 24 and the second base 136.

In some embodiments, the first map region and the second map region are regions in which an intersection region exists, or the first map region and the second map region are regions in which an intersection region does not exist. In some other embodiments, there is an intersection region in the first map region and the second map region, and the first map region and the second map region form a region corresponding to the entire virtual environment, or regions corresponding to the first map region and the second map region are a part of a region of the entire virtual environment. In some other embodiments, there is no intersection region in the first map region and the second map region, and the first map region and the second map region form a region corresponding to the entire virtual environment, or regions corresponding to the first map region and the second map region are a part of a region of the entire virtual environment.

It may be understood that based on skins worn by virtual objects in the same camp, when a specified environment element in a map region corresponding to the camp is switched, a manner in which the client counts skins worn by virtual objects in each camp is the same. A description is made below by using the first camp as an example.

At least one of the following conditions exists with a quantity of skins meeting a threshold as a trigger condition:

(1) Specified environment elements in a virtual environment are switched in batches according to a hierarchical threshold corresponding to a quantity of skins owned (worn) by virtual objects in the same group (that is, the same camp).

In response that the quantity of skins that are owned (worn) by the plurality of virtual objects in the first group (that is, the first camp) and that belong to the first skin series reaches an $i^{th}$ level first threshold, the first specified environment element belonging to a first set in the virtual environment is switched to the first virtual environment element corresponding to the first skin series, i being a positive integer.

Figure 10:
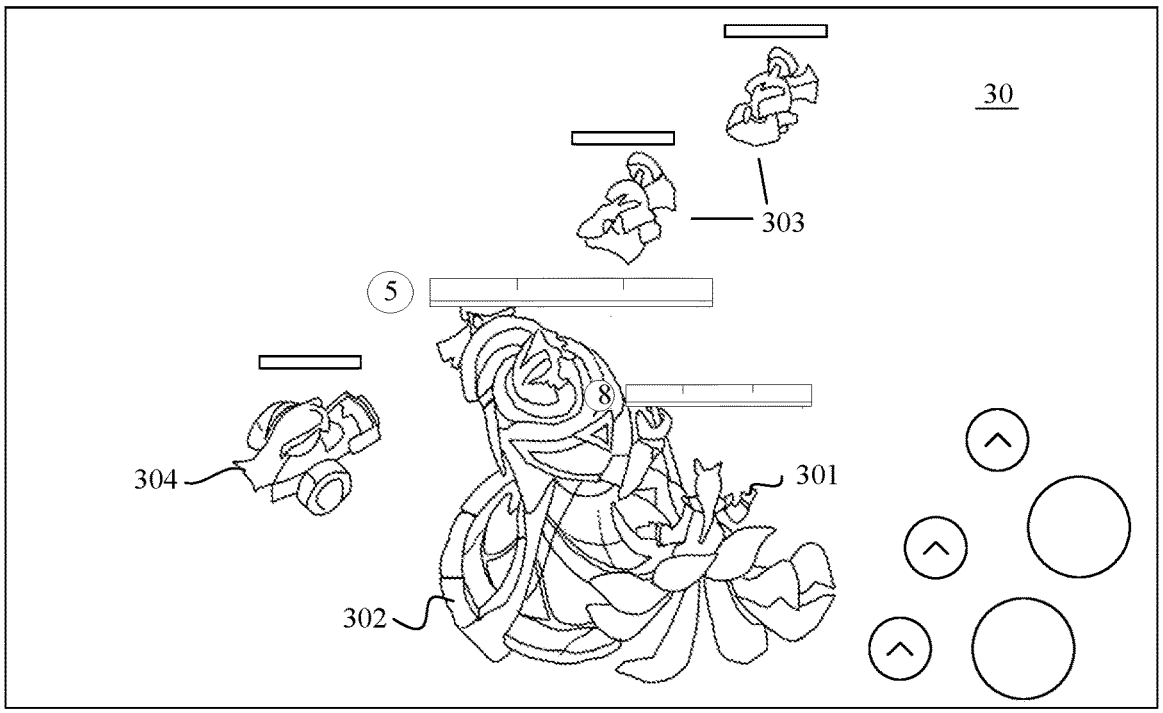
FIG. 10 is a schematic interface diagram of a user interface according to an exemplary embodiment of the disclosure.

When a virtual object does not wear a skin, a specified environment element in a virtual environment is not switched, as shown in FIG. 10. A user interface 30 includes a virtual environment, the virtual environment includes a virtual object 301, and the virtual object 301 is a virtual object that does not wear a skin.

The first specified environment element is a virtual environment element belonging to the first map region, and the first map region is a partial region of the entire virtual environment or is a region corresponding to the entire virtual environment. For example, as shown in FIG. 10, the virtual environment includes a plurality of first specified environment elements such as a turret element 302 fixed in the virtual environment, a creep element 303, and a gun carrier element 304.

For example, i is 1, the first threshold is 5, the first skin series is a robot skin series, and the first set includes all environment elements in the virtual environment. When a quantity of skins that are worn by virtual objects in the same camp and that belong to the robot skin series reaches 5 (the first level first threshold), all the environment elements in the virtual environment are switched to first virtual environment elements corresponding to the robot skin series.

In response that the quantity of skins that are owned (worn) by the plurality of virtual objects in the first group (that is, the first camp) and that belong to the first skin series reaches an $(i+1)^{th}$ level first threshold, the first specified environment element belonging to a second set in the virtual environment is switched to the first virtual environment element corresponding to the first skin series.

For example, i is 1, the first threshold is 3, the first skin series is a robot skin series, and the second set includes the creep element in the virtual environment. When the quantity of skins that are worn by the virtual objects in the same camp and that belong to the robot skin series reaches 3 (the second level first threshold), the creep element in the virtual environment is switched to the first virtual environment element corresponding to the robot skin series.

The $i^{th}$ level first threshold is greater than the $(i+1)^{th}$ level first threshold, a quantity of first specified environment elements in the first set is greater than a quantity of first specified environment element in the second set, and/or types of first specified environment elements in the first set are more than types of first specified environment elements in the second set.

For example, in some embodiments, when the quantity of skins that are worn by the plurality of virtual objects in the same camp and that belong to the first skin series reaches the $i^{th}$ level first threshold, the first set includes all the environment elements in the virtual environment. In some other embodiments, when the quantity of skins that are worn by the plurality of virtual objects in the same camp and that belong to the first skin series reaches the $(i+1)^{th}$ level first threshold, the first set includes a virtual unit in the virtual environment.

For example, in some embodiments, when the quantity of skins that are worn by the plurality of virtual objects in the same camp and that belong to the first skin series reaches the $i^{th}$ level first threshold, the first set includes a movable environment element (for example, a gun carrier element or a creep element) and a fixed element (for example, a turret element) in the virtual environment. In some other embodiments, when the quantity of skins that are worn by the plurality of virtual objects in the same camp and that belong to the first skin series reaches the $(i+1)^{th}$ level first threshold, the first set includes a fixed environment element in the virtual environment.

Figure 11:
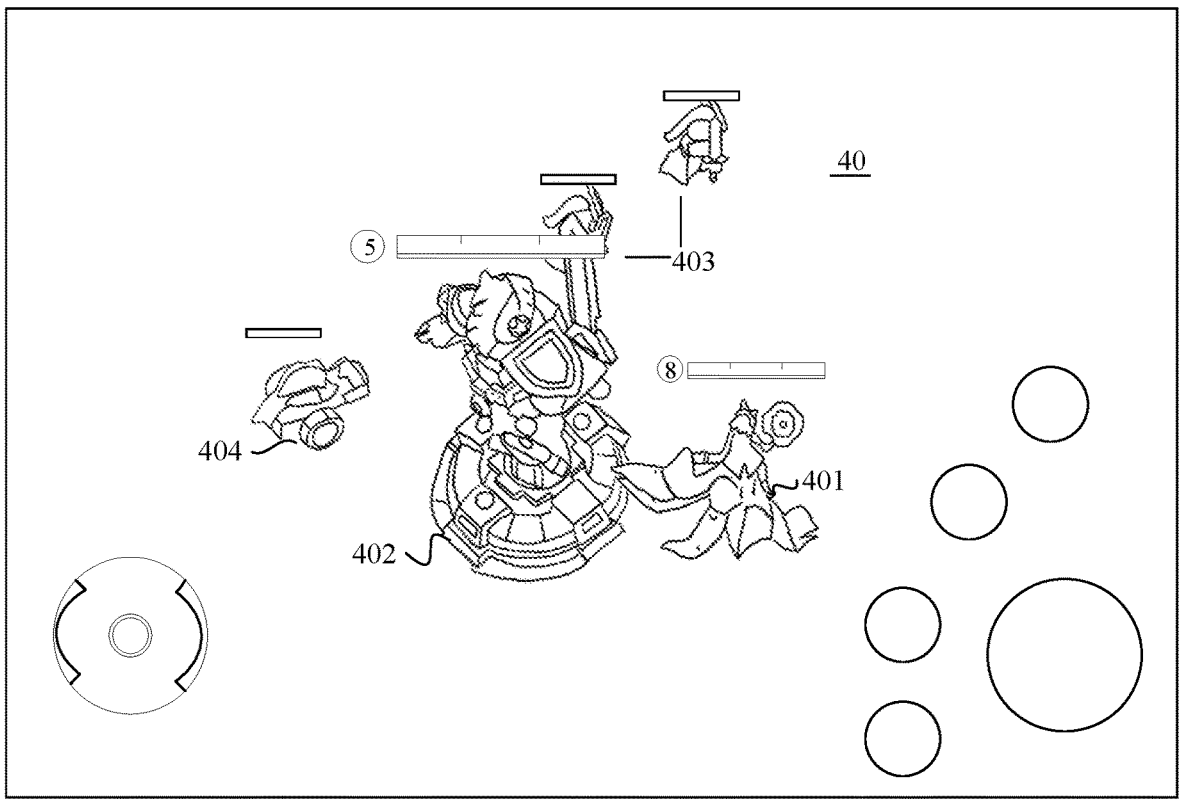
FIG. 11 is a schematic interface diagram of a user interface according to another exemplary embodiment of the disclosure.

As shown in FIG. 11, a virtual object 401 that wears a skin, a turret element 402, a creep element 403, and a gun carrier element 404 are displayed on a user interface 40. Compared with FIG. 10, it can be learned that the turret element is switched: The turret element 302 is switched to another turret element 402, and the creep element is also switched: The creep element 303 is switched to another creep element 403. The gun carrier element is not switched.

Figure 12:
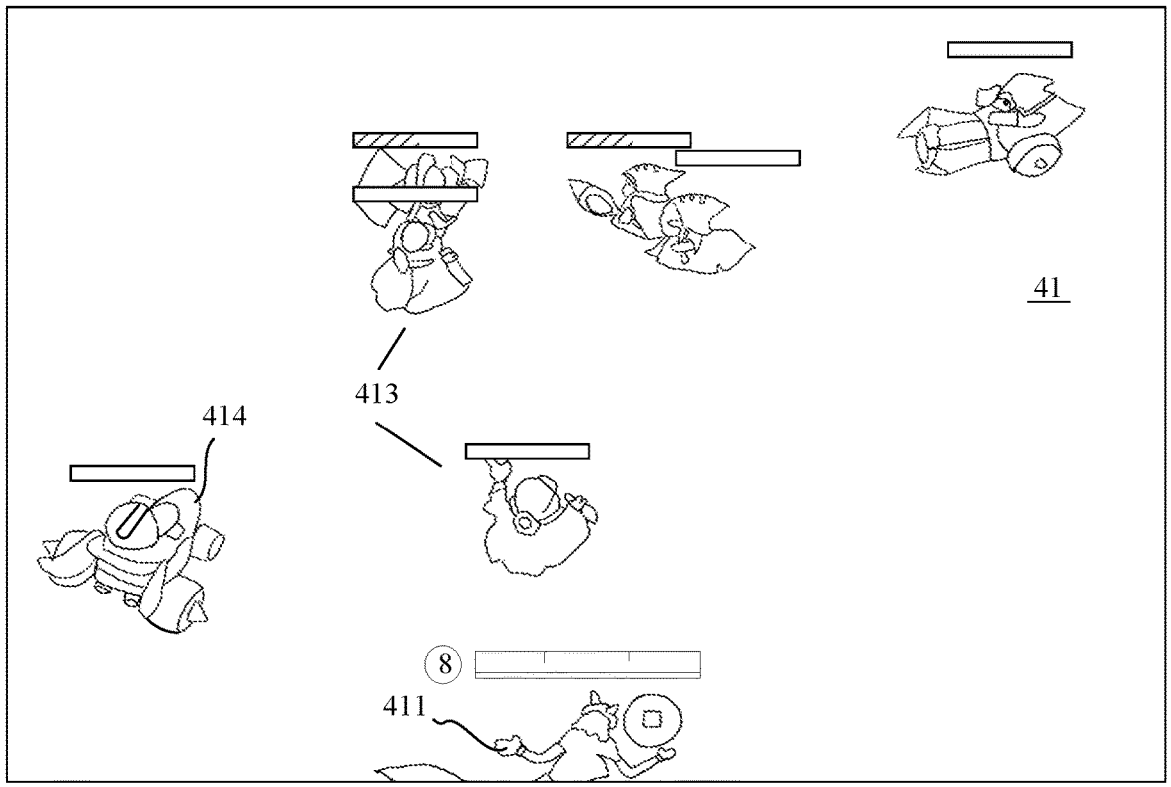
FIG. 12 is a schematic interface diagram of a user interface according to another exemplary embodiment of the disclosure.

As shown in FIG. 12, a virtual object 411 that wears a skin, a creep element 413, and a gun carrier element 414 are displayed on a user interface 41. Compared with FIG. 11, it can be learned that the creep element is also switched: The creep element 403 is switched to another creep element 413, and the gun carrier element is also switched: The gun carrier element 404 is switched to another gun carrier element 414.

It can be learned that when skins worn by virtual objects belong to the same skin series and meet the hierarchical threshold, first specified environment elements in the virtual environment are switched in batches to virtual environment elements specified by the skin series.

(2) Switch the specified environment elements in the virtual environment according to a priority of a skin series.

The first specified environment element in the virtual environment is switched to the first virtual environment element corresponding to the first skin series if a quantity of skins that are owned (worn) by some virtual objects in the first group (that is, the first camp) and that belong to the first skin series reaches the first threshold, a quantity of skins that are owned (worn) by other virtual objects in the first group (that is, the first camp) and that belong to a third skin series reaches a third threshold, and a priority of the first skin series is higher than a priority of the third skin series.

For example, there are five virtual objects in the first camp, the first threshold is 2, and the third threshold is 2. Skins worn by a virtual object 1 and a virtual object 2 belong to a constellation skin series and meet the first threshold; and skins worn by a virtual object 4 and a virtual object 5 belong to a robot skin series and meet the third threshold. Because a priority of the constellation skin series is higher than a priority of the robot skin series, the client switches the first specified environment element to a virtual environment element corresponding to the constellation skin series according to the constellation skin series.

(3) Switch the specified environment elements in the virtual environment according to a threshold.

The first specified environment element in the virtual environment is switched to the first virtual environment element corresponding to the first skin series if a quantity of skins that are owned (worn) by some virtual objects in the first group (that is, the first camp) and that belong to the first skin series reaches the first threshold, a quantity of skins that are owned (worn) by other virtual objects in the first group (that is, the first camp) and that belong to a third skin series reaches a third threshold, and the first threshold is greater than the third threshold.

For example, there are five virtual objects in the first camp, the first threshold is 3, and the third threshold is 2. Skins worn by a virtual object 1, a virtual object 2, and a virtual object 3 belong to a Halloween theme skin series and meet the first threshold; and skins worn by a virtual object 4 and a virtual object 5 belong to a Christmas theme skin series and meet the third threshold. Because the first threshold is greater than the third threshold, the client switches the first specified environment element to a virtual environment element corresponding to the Halloween theme skin series according to the Halloween theme skin series.

Figure 13:
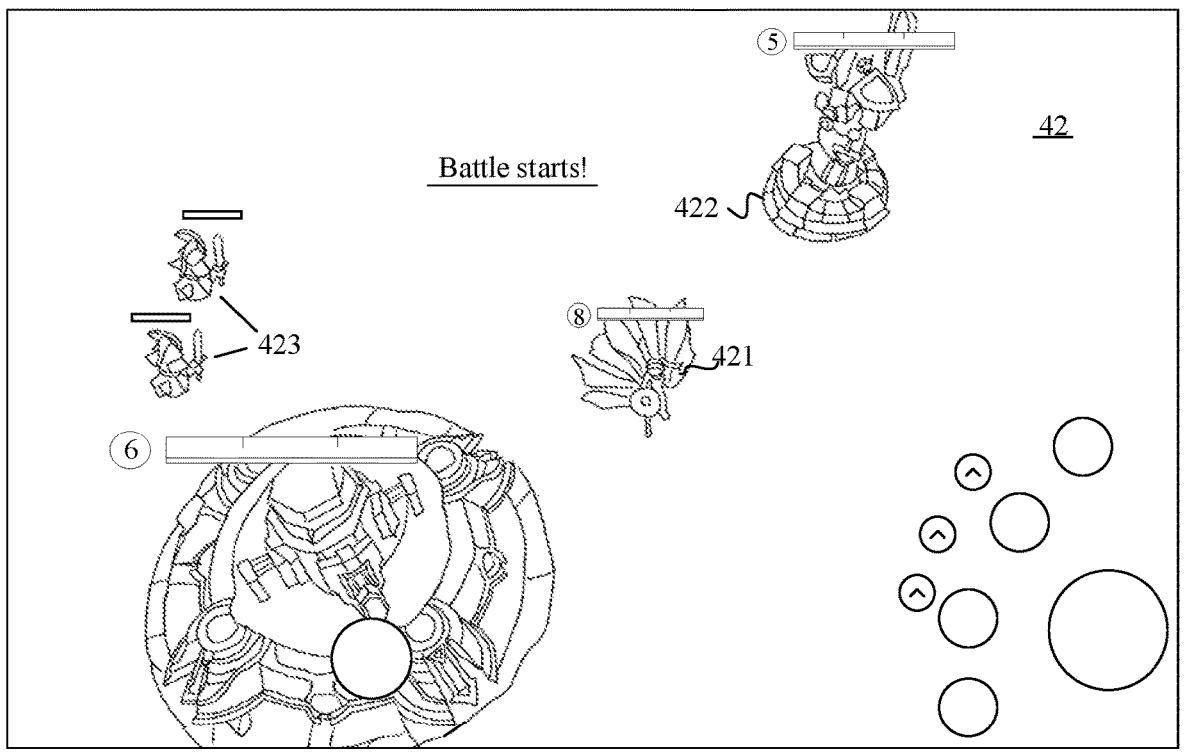
FIG. 13 is a schematic interface diagram of a user interface according to another exemplary embodiment of the disclosure.

The environment element switching method is implemented before the virtual objects start a battle. After the virtual objects start the battle, the user can view switched environment elements on the user interface, as shown in FIG. 13. A "battle starts" typeface is displayed on a user interface 42, and a virtual object 421 is a virtual object that has worn a skin. In this case, both a turret element 422 and a creep element 423 in a virtual environment have been switched to elements corresponding to a skin series of the virtual object 421.

In summary, according to the method provided in this embodiment, by determining whether a quantity of skins that are worn by virtual objects and that belong to the same skin series reaches a threshold, it is determined that a specified environment element in a virtual environment is switched to which virtual environment element. Switching of a corresponding environment element is automatically triggered according to skins that are worn by the virtual objects and that belong to different skin series, so that scene switching of the virtual environment is no longer limited to several fixed scenes provided by a system, and more scene types are provided for scene switching of the virtual environment, thereby improving a matching degree between the virtual object and the environment element, implementing personalized display of the virtual environment, and obtaining a good display effect.

The threshold is ranked, and when a quantity of skins that are worn by virtual objects in the same camp and that belong to the same skin series reaches a threshold of a level, specified environment elements in a set corresponding to the threshold of the level are switched in batches. Therefore, a manner of switching an environment element is richer, and the virtual environment can be switched between a plurality of scene types.

When the skins worn by the virtual objects in the same camp can simultaneously meet switching of virtual environment elements corresponding to a plurality of skin series, it is determined, according to priorities of the skin series, that the specified environment element in the virtual environment is switched to a virtual environment element corresponding to a skin series with a highest priority, and on the premise that the plurality of scene types can be switched for the virtual environment, styles of environment elements in the virtual environment are ensured to have unity.

When the skins worn by the virtual objects in the same camp meet a plurality of thresholds, it is determined, according to the thresholds, that the specified environment element in the virtual environment is switched to a virtual environment element corresponding to a skin series meeting a relatively large threshold, and on the premise that the plurality of scene types can be switched for the virtual environment, styles of environment elements in the virtual environment are ensured to have unity.

The above three cases may be implemented separately, or may be implemented in pairs, or may be all implemented.

Figure 14:
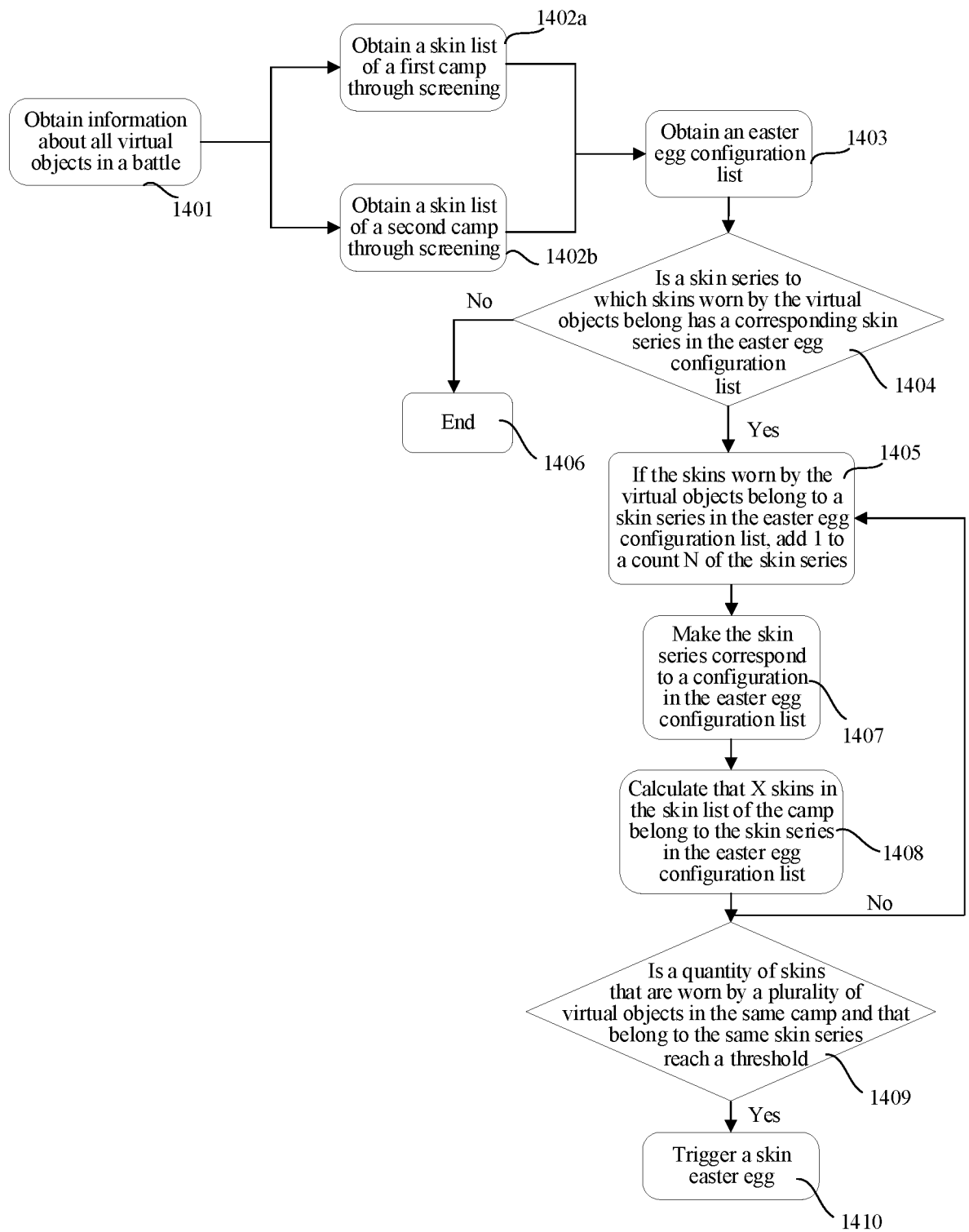
FIG. 14 is a flowchart of a virtual environment display method according to another exemplary embodiment of the disclosure.

For the three cases described above, an entire process of switching the environment element is described, as shown in FIG. 14. The method is applicable to the first terminal 120 or the second terminal 160 in the computer system 100 shown in FIG. 2 or another terminal in the computer system. The method includes the following steps 1401 to 1410.

Step 1401. Obtain information about all virtual objects in a battle.

A game is used as an example, and before virtual objects start a game, a game client obtains information about the virtual objects participating in a battle, including information such as names, occupations, attributes, levels, worn skins of the virtual objects.

Step 1402*a*. Obtain a skin list of a first camp through screening.

Step 1402*b*. Obtain a skin list of a second camp through screening.

For example, camps participating in the battle include a first camp and a second camp, and the game client obtains a skin list of virtual objects in the first camp and a skin list of virtual objects in the second camp. The game client may simultaneously obtain skin lists of two camps or obtain skin lists of two camps in sequence. This is not limited in this embodiment of the disclosure.

Step 1403: Obtain an Easter egg configuration list.

As shown in Table 2, the Easter egg configuration list includes a skin Easter egg ID, a skin series ID, a skin Easter egg, a trigger threshold, a priority, and a resource path. For example, the Easter egg configuration list includes M configurations, that is, M skin Easter eggs, M being a positive integer.

Step 1404. Determine whether a skin series to which a skin worn by a virtual object belongs has a corresponding skin series in the Easter egg configuration list.

If a skin series to which the skin worn by the virtual object belongs exists in the Easter egg configuration list, step 1405 is performed; and if the skin series to which the skin worn by the virtual object belongs does not exist in the Easter egg configuration list, step 1406 is performed.

Step 1405. When the skin worn by the virtual object belongs to a skin series in the Easter egg configuration list, add 1 to a count N of the skin series, N being greater than or equal to 0 and N being an integer.

The game client compares a skin worn by each virtual object in the same camp with skin series in the Easter egg configuration list in sequence. For example, if the first virtual object in the first camp wears a skin belonging to a robot skin series, and the Easter egg configuration list includes a skin Easter egg that can be triggered by the robot skin series, a count N of the robot skin series is increased by 1.

By analogy, for example, if three virtual objects in the first camp wear skins belonging to the robot skin series, and the Easter egg configuration list includes the skin Easter egg that can be triggered by the robot skin series, the count of the robot skin series is counted as 3.

Step 1406. End.

If the skin worn by the virtual object is not in a range of the Easter egg configuration list, a manner of switching environment elements by using the skin worn by the virtual object is ended.

Step 1407. Make skin series correspond to configurations in the Easter egg configuration list.

For example, the robot skin series triggers a skin Easter egg 3, and a Christmas theme skin series triggers a skin Easter egg 2.

Step 1408. Calculate that X skins in the skin list in the camp belong to the skin series in the Easter egg configuration list, X being greater than or equal to 0 and X being an integer.

A quantity of skins in skin series to which skins in the skin list of the same camp belong and that correspond to the Easter egg configuration list is counted.

Step 1409. Determine whether a quantity of skins that are worn by a plurality of virtual objects in the same camp and that belong to the same skin series reaches a threshold.

For a relationship between a quantity of skins worn by virtual objects and switching of an environment element, reference may be made to the above three cases for implementation: the specified environment elements in the virtual environment are switched in batches according to the hierarchical threshold corresponding to the quantity of skins worn by the virtual objects in the same camp, the specified environment elements in the virtual environment are switched according to the priorities of the skin series, and the specified environment elements in the virtual environment are switched according to a threshold. Details are not described herein again.

If the quantity of skins that are worn by the plurality of virtual objects in the same camp and that belong to the same skin series reaches the threshold, step 1410 is performed; and if the quantity of skins that are worn by the plurality of virtual objects in the same camp and that belong to the same skin series does not reach the threshold, step 1405 is performed.

Step 1410. Trigger a skin Easter egg.

After a skin Easter egg triggered, a specified environment element in the virtual environment is switched to a virtual environment element corresponding to the skin series.

Figure 15:
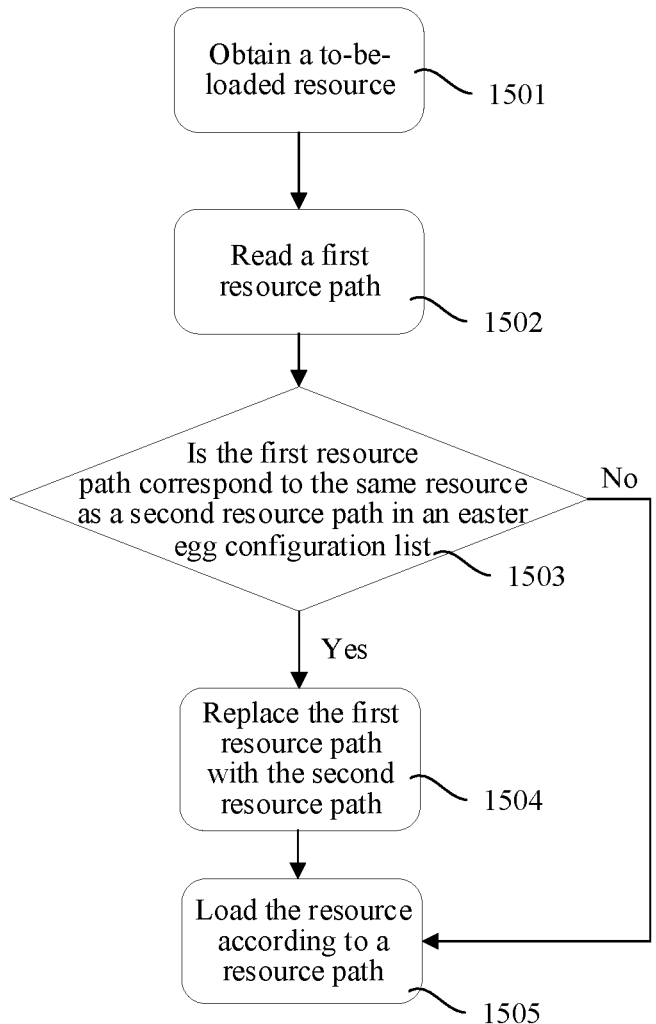
FIG. 15 is a flowchart of a virtual environment display method according to another exemplary embodiment of the disclosure.

A processing method after the skin Easter egg is triggered is described below, as shown in FIG. 15. The method is applicable to the first terminal 120 or the second terminal 160 in the computer system 100 shown in FIG. 2 or another terminal in the computer system. The method includes the following steps 1501 to 1505.

Step 1501. Obtain a to-be-loaded resource.

A game is used as an example, and before a game battle is started, a game client needs to load a resource in a virtual environment, for example, a resource corresponding to a tree element, a ground element, or the like in the virtual environment. In addition, the game client determines a triggerable skin Easter egg according to a skin worn by a virtual object.

Step 1502. Read a first resource path.

The first resource path is a resource path of the specified environment element in the virtual environment.

Step 1503. Determine whether the first resource path corresponds to the same resource as a second resource path in the Easter egg configuration list.

The game client determines the resource according to the first resource path, the skin worn by the virtual object also trigger switching of environment elements in the virtual environment, and the game client determines whether an environment element corresponding to the resource is the same element or the same type of element as a virtual environment element to be switched according to the skin worn by the virtual object. If the environment element and the virtual environment element correspond to the same element or the same type of element, step 1504 is performed; and if the environment element and the virtual environment element correspond to different elements, step 1505 is performed.

For example, the game client determines that a to-be-loaded resource is a stone element in the virtual environment according to the first resource path, but a skin Easter egg triggered by the skin worn by the virtual object also needs to be switched to the stone element in the virtual environment, and the game client determines that the first resource path and the second resource path in the Easter egg configuration list correspond to the same resource, so that step 1504 is performed.

In another example, the game client determines that the to-be-loaded resource is the stone element in the virtual environment according to the first resource path, but a skin Easter egg triggered by the skin worn by the virtual object needs to be switched to a tree element in the virtual environment, and the game client determines that the first resource path and the second resource path in the Easter egg configuration list correspond to different resources, so that step 1505 is performed.

Step 1504. Replace the first resource path with the second resource path.

The first resource path is replaced with the second resource path in the Easter egg configuration list, so that the game client loads the resource according to the second resource path.

Step 1505. Load the resource according to the resource path.

The game client loads a corresponding resource according to a final resource path. After determining that the first resource path and the second resource path in the Easter egg configuration list correspond to the same resource, the game client loads the resource according to the second resource path, to obtain an environment element after the switching. After determining that the first resource path and the second resource path in the Easter egg configuration list correspond to different resources, the game client loads a resource according to the original first resource path, and an environment element corresponding to the resource does not change.

In summary, skins worn by virtual objects are associated with a triggered skin Easter egg in an Easter egg configuration list. When a quantity of skins that are worn by virtual objects and that belong to the same skin series reaches a threshold of triggering a skin Easter egg, a specified environment element in a virtual environment is automatically switched to an environment element corresponding to the skin series. Switching of a corresponding environment element is automatically triggered according to skins that are worn by the virtual objects and that belong to different skin series, so that scene switching of the virtual environment is no longer limited to several fixed scenes provided by a system, and more scene types are provided for scene switching of the virtual environment, thereby improving a matching degree between the virtual object and the environment element, implementing personalized display of the virtual environment, and obtaining a good display effect.

A first resource path is replaced with a second resource path, so that a virtual environment element corresponding to the skin series is loaded according to the second resource path after the replacement, to complete an environment element switching process, thereby ensuring accuracy of the environment element switching.

The foregoing method is described based on a game application scenario in the foregoing embodiments, and the following is an exemplary description of the foregoing method based on a military simulation application scenario.

A simulation technology is a model technology in which a system behavior or process is reflected by using software and hardware through an experiment of simulating a real world.

A military simulation application is an application specially constructed for military application by using the simulation technology, which performs quantitative analysis on battle elements such as sea, land, and air, weapon equipment performance, battle action, and the like, to accurately simulate a battlefield environment, and present a battlefield status, thereby achieving battle system evaluation and decision aids.

In an example, soldiers set up a virtual battlefield on a terminal on which the military simulation client is located, and fight in teams. The soldiers control virtual objects in the virtual battlefield environment to perform at least one operation of standing, squatting, sitting, lying, going prone, side lying, walking, running, climbing, driving, shooting, throwing, attacking, injuring, reconnaissance, and close combat in the virtual battlefield environment. The virtual battlefield environment includes at least one natural form element of a plain, a mountain, a plateau, a basin, a desert, a river, a lake, a sea, and vegetation, and a place form element such as a building, a transport vehicle, a ruin, and a training ground. The virtual object includes a virtual character role, a virtual animal role, a cartoon character role, or the like. Each virtual object owns a shape and size in a three-dimensional virtual environment, and occupies some space in the three-dimensional virtual environment.

Based on the foregoing, in an example, there are two teams of soldier-controlled virtual objects in the virtual environment for a battle. For example, a first team includes a virtual object a controlled by a soldier 1, a virtual object b controlled by a soldier 2, a virtual object c controlled by a soldier 3, a virtual object d controlled by a soldier 4, and a virtual object e controlled by a soldier 5. A second team includes a virtual object A controlled by a first soldier, a virtual object B controlled by a second soldier, a virtual object C controlled by a third soldier, a virtual object D controlled by a fourth soldier, and a virtual object E controlled by a fifth soldier.

The virtual object a, the virtual object b, the virtual object c, and the virtual object d wears skins belong to a robot skin series, and the virtual object e does not wear a skin. The virtual object A, the virtual object B, and the virtual object C wear skins of a martial art series.

The military simulation client determines, according to a condition of the skins worn by the virtual objects of the two teams, that the virtual objects of the first team trigger a skin Easter egg K: a creep element and a gun carrier element in the virtual environment and a turret element fixed in the virtual environment are switched to virtual environment elements corresponding to the robot skin series; and determines that the virtual objects of the second team trigger a skin Easter egg Q: the creep element in the virtual environment is switched to a virtual environment element corresponding to the martial art skin series.

In the virtual environment, the creep element, the gun carrier element, and the turret element that correspond to the first team are switched to the virtual environment elements corresponding to the robot skin series, and the creep element corresponding to the second team is switched to the virtual environment element corresponding to the martial art skin series.

In conclusion, in this embodiment, the virtual environment display method is applicable to the military simulation client, and a scene of a virtual environment may be switched without manual use of a virtual prop by a soldier. In addition, a skin changing operation of a single soldier does not affect switching of an environment element, thereby enhancing a cooperative relationship between the soldiers. An actual battle site is simulated more truly, so that the soldiers are trained better.

Figure 16:
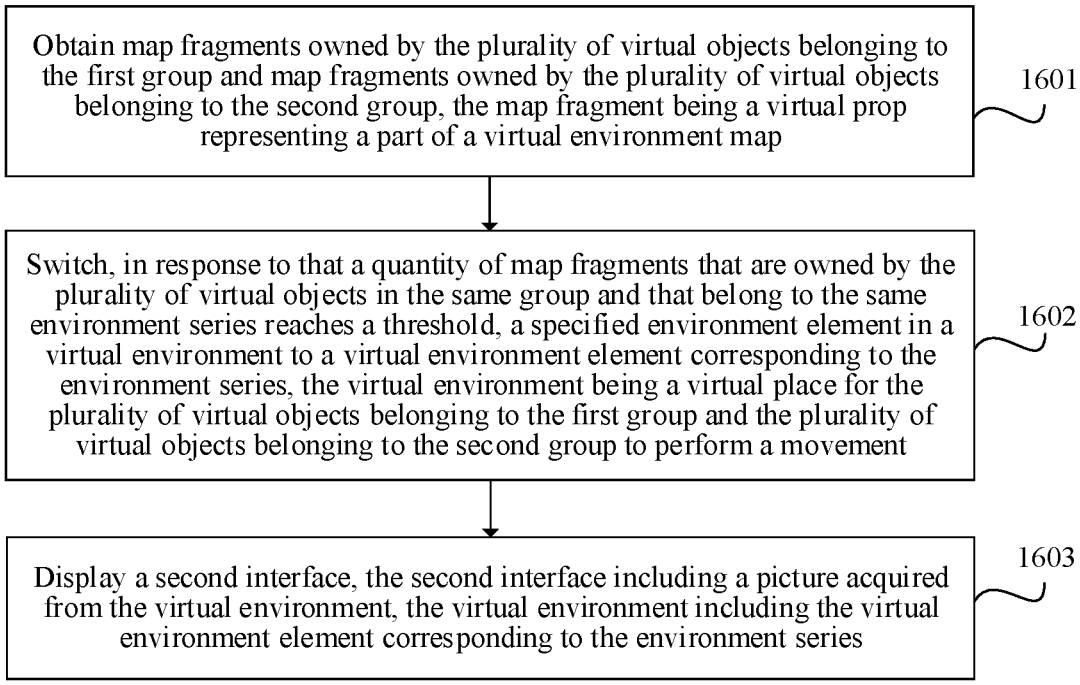
FIG. 16 is a flowchart of a virtual environment display method according to another exemplary embodiment of the disclosure.

The embodiments of the disclosure further provide a virtual environment display method, as shown in FIG. 16. The method is applicable to the first terminal 120 or the second terminal 160 in the computer system 100 shown in FIG. 2 or another terminal in the computer system. The virtual environment display method in this embodiment is similar to the embodiment shown in FIG. 5 and first includes: displaying a first interface, the first interface including object display pages of a plurality of virtual objects belonging to a first group and object display pages of a plurality of virtual objects belonging to a second group. In this embodiment, the first interface is a round beginning loading interface, and the object display page of the virtual object is an object poster of the virtual object and is used for displaying an appearance and information about the virtual object. The virtual environment includes virtual objects of at least two groups (or referred to as camps), and in this embodiment of the disclosure, virtual objects of a first group (that is, a first camp) and virtual objects of a second group (that is, a second camp) are used as an example for description. Different from the embodiment shown in FIG. 5, the method further includes the following steps 1601 to 1603.

Step 1601. Obtain map fragments owned by the plurality of virtual objects belonging to the first group and map fragments owned by the plurality of virtual objects belonging to the second group, the map fragment being a virtual prop representing a part of a virtual environment map.

The map fragment is a virtual prop that is owned by a virtual object and that represents a virtual environment map. In some embodiments, the map fragment is named as a map puzzle, and a plurality of map fragments are put together to form a complete virtual environment map.

A manner in which a virtual object obtains a map fragment includes, but is not limited to: purchasing a map fragment, obtaining a map fragment through a draw, obtaining a reward including a map fragment after a task is completed, obtaining a map fragment sent by another virtual object, asking, by a virtual object, for a map fragment from another virtual object, and picking up, by a virtual object, a map fragment in a virtual environment.

There are a plurality of themes of maps corresponding to the virtual environment, for example, a city map, a desert map, a mountain map, and a snowfield map. Maps of different themes correspond to a series of map fragments.

For example, the virtual objects in the first camp own map fragments corresponding to the city map, and the virtual objects in the second camp own map fragments corresponding to the desert map.

Step 1602. Switch, if a quantity of map fragments that are owned by the plurality of virtual objects in the same group and that belong to the same environment series reaches a threshold, a specified environment element in a virtual environment to a virtual environment element corresponding to the environment series, the virtual environment being a virtual place for the plurality of virtual objects belonging to the first group and the plurality of virtual objects belonging to the second group to perform a movement.

Similar to the manner of switching an environment element triggered by the skin worn by the virtual object, a correspondence between a quantity of map fragments belonging to the same environment series and triggering of positive feedback may be established, and the correspondence is represented by another positive feedback configuration list. In this embodiment, the positive feedback may be a fragment Easter egg, and the fragment Easter egg configuration list is shown in Table 3.

TABLE 3

| Map fragments | Environment series | Fragment Easter eggs | Trigger threshold | Priority | Resource paths |
|---|---|---|---|---|---|
| Fragment 1, Fragment 2, Fragment 3 | City series | Fragment Easter egg 1: switching a building element in a virtual environment | A quantity of map fragments belonging to the city series in the same camp is 3 | Fragment Easter egg 3 > Fragment Easter egg 2 > Fragment Easter egg 1 | Path 11 |
| Fragment 4, Fragment 5, | Desert series | Fragment Easter egg 2: switching | A quantity of map fragments | | Path 44 |

TABLE 3-continued

| Map fragments | Environment series | Fragment Easter eggs | Trigger threshold | Priority | Resource paths |
|---|---|---|---|---|---|
| Fragment 6 | | a plant element in the virtual environment | belonging to the desert series in the same camp is 2 | | |
| Fragment 7, Fragment 8, Fragment 9 | Mountain series | Fragment Easter egg 3: switching a virtual unit (for example, a turret or a Nexus) in the virtual environment | A quantity of map fragments belonging to the mountain series in the same camp is 5 | | Path 77 |

In an example, when map fragments owned by virtual objects in the same camp are the fragment 1, the fragment 2, the fragment 3, and virtual objects in another camp do not have map fragments, the fragment Easter egg 1 is triggered, and the client switches the building element in the virtual environment to an element related to the city series, for example, a traffic light element or a skyscraper element.

In an example, when the map fragments owned by the virtual objects in the same camp trigger two fragment Easter eggs such as the fragment Easter egg 1 and the fragment Easter egg 2 at the same time, the fragment Easter egg 2 is preferentially triggered according to the priorities of the fragment color eggs. That is, the client switches the plant element in the virtual environment to a virtual environment element corresponding to the desert series, for example, a cactus element.

Similarly, the switching of an environment element triggered by a quantity of map fragments owned by virtual objects may be set according to the three cases in the foregoing embodiments: the specified environment elements in the virtual environment are switched in batches according to a hierarchical threshold corresponding to a quantity of fragments owned by the virtual objects in the same camp, the specified environment elements in the virtual environment are switched according to the priorities of the environment series, and the specified environment elements in the virtual environment are switched according to a threshold. Details are not described herein again.

Step 1603. Display a second interface, the second interface including a picture acquired from the virtual environment, the virtual environment including the virtual environment element corresponding to the environment series.

In this embodiment, the second interface is a battle interface and is an interface displayed after a battle is started. The virtual environment displayed in the battle interface includes the virtual environment element corresponding to the environment series.

In summary, according to the method provided in this embodiment, a relationship between a map fragment owned by a virtual object and switching of a specified environment element in a virtual environment is established, and when a quantity of map fragments that are owned by a plurality of virtual objects in the same camp and that belong to the same environment series meet a trigger condition, the specified environment element in the virtual environment is automatically switched to a virtual environment element corresponding to the environment series. Switching of a corresponding environment element is automatically triggered according to map fragments that are owned by the virtual objects and that belong to different environment series, so that scene switching of the virtual environment is no longer limited to several fixed scenes provided by a system, and more scene types are provided for scene switching of the virtual environment, thereby improving a matching degree between the virtual object and the environment element, implementing personalized display of the virtual environment, and obtaining a good display effect.

Based on the embodiment of FIG. 16, that a quantity of map fragments meets a threshold is used as a trigger condition to be applied to at least one camp that participates in a battle.

1. Switch, if a quantity of map fragments that are owned by the plurality of virtual objects in the first camp and that belong to a first environment series reaches a first threshold, a first specified environment element in the virtual environment to a first virtual environment element corresponding to the first environment series.

The virtual environment includes a first map region owned by the first camp, and the first specified environment element is a virtual environment element belonging to the first map region. As shown in FIG. 9, the first specified environment element includes the turret element 24 and the first base 135.

2. Switch, if a quantity of map fragments that are owned by the plurality of virtual objects in the second camp and that belong to a second environment series reaches a second threshold, a second specified environment element in the virtual environment to a second virtual environment element corresponding to the second environment series.

The virtual environment includes a second map region owned by the second camp, and the second specified environment element is a virtual environment element belonging to the second map region. As shown in FIG. 9, the second specified environment element includes the turret element 24 and the second base 136.

In some embodiments, the first map region and the second map region are regions in which an intersection region exists, or the first map region and the second map region are regions in which an intersection region does not exist. In some other embodiments, there is an intersection region in the first map region and the second map region, and the first map region and the second map region form a region corresponding to the entire virtual environment, or regions corresponding to the first map region and the second map region are a part of a region of the entire virtual environment. In some other embodiments, there is no intersection region in the first map region and the second map region, and the first map region and the second map region form a region corresponding to the entire virtual environment, or regions corresponding to the first map region and the second map region are a part of a region of the entire virtual environment.

It may be understood that based on a quantity of map fragments owned by virtual objects in the same camp, when a specified environment element in a map region corresponding to the camp is switched, a manner in which the client counts a quantity of map fragments owned by virtual objects in each camp is the same. A description is made below by using the first camp as an example.

At least one of the following conditions exists with a quantity of map fragments meeting a threshold as a trigger condition:

(1) Specified environment elements in a virtual environment are switched in batches according to a hierarchical threshold corresponding to a quantity of map fragments owned by virtual objects in the same camp.

In response that the quantity of map fragments that are owned by the plurality of virtual objects in the first camp and that belong to the first environment series reaches an $i^{th}$ level first threshold, the first specified environment element belonging to a first set in the virtual environment is switched to the first virtual environment element corresponding to the first environment series, i being a positive integer.

The first specified environment element is a virtual environment element belonging to the first map region, and the first map region is a partial region of the entire virtual environment or is a region corresponding to the entire virtual environment. For example, as shown in FIG. 10, the virtual environment includes a plurality of first specified environment elements such as a turret element 302 fixed in the virtual environment, a creep element 303, and a gun carrier element 304.

For example, i is 1, the first threshold is 5, the first environment series is a time traveler series, and the first set includes all environment elements in the virtual environment. When a quantity of map fragments that are owned by virtual objects in the same camp and that belong to the time traveler series reaches 5 (the first level first threshold), all the environment elements in the virtual environment are switched to first virtual environment elements corresponding to the time traveler series.

In response that the quantity of map fragments that are owned by the plurality of virtual objects in the first camp and that belong to the first environment series reaches an $(i+1)^{th}$ level first threshold, the first specified environment element belonging to a second set in the virtual environment is switched to the first virtual environment element corresponding to the first environment series.

For example, i is 1, the first threshold is 3, the first environment series is a Three-Kingdom Five Tiger Generals series, and the second set includes the creep element in the virtual environment. When the quantity of map fragments that are owned by the virtual objects in the same camp and that belong to the Three-Kingdom Five Tiger Generals series reaches 3 (the second level first threshold), the creep element in the virtual environment is switched to a first virtual environment element corresponding to the Three-Kingdom Five Tiger Generals series.

The $i^{th}$ level first threshold is greater than the $(i+1)^{th}$ level first threshold, a quantity of first specified environment elements in the first set is greater than a quantity of first specified environment element in the second set, and/or types of first specified environment elements in the first set are more than types of first specified environment elements in the second set.

For example, in some embodiments, when the quantity of map fragments that are owned by the plurality of virtual objects in the same camp and that belong to the first environment series reaches the $i^{th}$ level first threshold, the first set includes all the environment elements in the virtual environment. In some other embodiments, when the quantity of map fragments that are owned by the plurality of virtual objects in the same camp and that belong to the first environment series reaches the $(i+1)^{th}$ level first threshold, the first set includes a virtual unit in the virtual environment.

For example, in some embodiments, when the quantity of map fragments that are owned by the plurality of virtual objects in the same camp and that belong to the first environment series reaches the $i^{th}$ level first threshold, the first set includes a movable environment element (for example, a gun carrier element or a creep element) and a fixed element (for example, a turret element) in the virtual environment. In some other embodiments, when the quantity of map fragments that are owned by the plurality of virtual objects in the same camp and that belong to the first environment series reaches the $(i+1)^{th}$ level first threshold, the first set includes a fixed environment element in the virtual environment.

As shown in FIG. 11, a turret element 402, a creep element 403, and a gun carrier element 404 are displayed on a user interface 40. Compared with FIG. 10, it can be learned that the turret element is switched: The turret element 302 is switched to another turret element 402, and the creep element is also switched: The creep element 303 is switched to another creep element 403. The gun carrier element is not switched.

As shown in FIG. 12, a creep element 413 and a gun carrier element 414 are displayed on a user interface 41. Compared with FIG. 11, it can be learned that the creep element is also switched: The creep element 403 is switched to another creep element 413, and the gun carrier element is also switched: The gun carrier element 404 is switched to another gun carrier element 414.

It can be learned that when map fragments owned by virtual objects belong to the same environment series and meet the hierarchical threshold, first specified environment elements in the virtual environment are switched in batches to virtual environment elements specified by the environment series.

(2) Switch the specified environment elements in the virtual environment according to a priority of an environment series.

The first specified environment element in the virtual environment is switched to the first virtual environment element corresponding to the first environment series if a quantity of map fragments that are owned by some virtual objects in the first camp and that belong to the first environment series reaches the first threshold, a quantity of map fragments that are owned by other virtual objects in the first camp and that belong to a third environment series reaches a third threshold, and a priority of the first environment series is higher than a priority of the third environment series.

For example, there are five virtual objects in the first camp, the first threshold is 2, and the third threshold is 2. Map fragments owned by a virtual object 1 and a virtual object 2 belong to the time traveler series and meet the first threshold; and map fragments owned by a virtual object 4 and a virtual object 5 belong to the Three-Kingdom Five Tiger Generals series and meet the third threshold. Because a priority of the map fragments belonging to the time traveler series is higher than a priority of the map fragments belonging to the Three-Kingdom Five Tiger Generals series, the client switches the first specified environment element to a virtual environment element corresponding to the time traveler series according to the time traveler series.

(3) Switch the specified environment elements in the virtual environment according to a threshold.

The first specified environment element in the virtual environment is switched to the first virtual environment element corresponding to the first environment series if a quantity of map fragments that are owned by some virtual objects in the first camp and that belong to the first environment series reaches the first threshold, a quantity of map fragments that are owned by other virtual objects in the first camp and that belong to a third environment series reaches a third threshold, and the first threshold is greater than the third threshold.

For example, there are five virtual objects in the first camp, the first threshold is 3, and the third threshold is 2. Map fragments owned by a virtual object 1, a virtual object 2, and a virtual object 3 belong to the time traveler series and meet the first threshold; and map fragments owned by a virtual object 4 and a virtual object 5 belong to the Three-Kingdom Five Tiger Generals series and meet the third threshold. Because the first threshold is greater than the third threshold, the client switches the first specified environment element to a virtual environment element corresponding to the time traveler series according to the time traveler series.

The environment element switching method is implemented before the virtual objects start a battle. After the virtual objects start the battle, the user can view switched environment elements on the user interface, as shown in FIG. 13. A "battle starts" typeface is displayed on a user interface 42. In this case, both a turret element 422 and a creep element 423 in a virtual environment have been switched to elements corresponding to an environment series to which map fragments owned by virtual objects belong.

In summary, according to the method provided in this embodiment, by determining whether a quantity of map fragments that are owned by virtual objects and that belong to the same environment series reaches a threshold, it is determined that a specified environment element in a virtual environment is switched to which virtual environment element. Switching of a corresponding environment element is automatically triggered according to map fragments that are owned by the virtual objects and that belong to different environment series, so that scene switching of the virtual environment is no longer limited to several fixed scenes provided by a system, and more scene types are provided for scene switching of the virtual environment, thereby improving a matching degree between the virtual object and the environment element, implementing personalized display of the virtual environment, and obtaining a good display effect.

The threshold is ranked, and when a quantity of map fragments that are owned by virtual objects in the same camp and that belong to the same environment series reaches a threshold of a level, specified environment elements in a set corresponding to the threshold of the level are switched in batches. Therefore, a manner of switching an environment element is richer, and the virtual environment can be switched between a plurality of scene types.

When the map fragments owned by the virtual objects in the same camp can simultaneously meet switching of virtual environment elements corresponding to a plurality of environment series, it is determined, according to priorities of the environment series, that the specified environment element in the virtual environment is switched to a virtual environment element corresponding to an environment series with a highest priority, and on the premise that the plurality of scene types can be switched for the virtual environment, styles of environment elements in the virtual environment are ensured to have unity.

When the quantity of map fragments owned by the virtual objects in the same camp meet a plurality of thresholds, it is determined, according to the thresholds, that the specified environment element in the virtual environment is switched to a virtual environment element corresponding to an environment series meeting a relatively large threshold, and on the premise that the plurality of scene types can be switched for the virtual environment, styles of environment elements in the virtual environment are ensured to have unity.

The above three cases may be implemented separately, or may be implemented in pairs, or may be all implemented.

Figure 17:
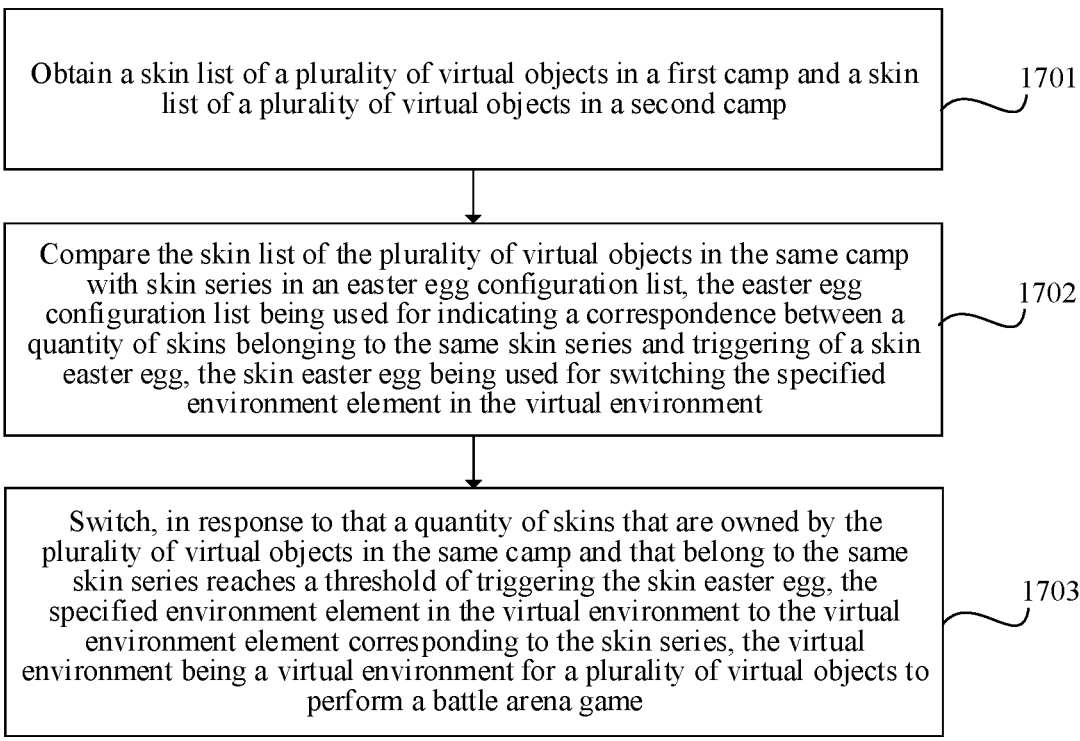
FIG. 17 is a flowchart of a virtual environment display method according to another exemplary embodiment of the disclosure.

FIG. 17 shows a virtual environment display method according to an exemplary embodiment of the disclosure. The method is applicable to the first terminal 120 or the second terminal 160 in the computer system 100 shown in FIG. 2 or another terminal in the computer system. The method includes the following steps 1701 to 1703.

Step 1701. Obtain a skin list of a plurality of virtual objects in the same camp, the same camp including a first camp or a second camp.

A game is used as an example, and before the game is started, the user selects a cloth (that is, a skin) worn by a virtual object when participating in a battle. For example, the virtual object flies along a route from above a virtual environment by airplane and may jump off at any time along the route, and the virtual object lands on a ground of the virtual environment by using a parachute. One camp includes at least one virtual object, and an enemy camp may include the same quantity of virtual objects or different quantities of virtual objects.

For example, camps participating in the battle include a first camp and a second camp, and the game client obtains a clothing list of clothes worn by virtual objects in the first camp and a clothing list of clothes worn by virtual objects in the second camp.

Step 1702. Compare the skin list of the plurality of virtual objects in the same camp with skin series in an Easter egg configuration list, the Easter egg configuration list being used for indicating a correspondence between a quantity of skins belonging to the same skin series and triggering of a skin Easter egg, and the skin Easter egg is used for switching a specified environment element in the virtual environment.

For example, the first camp includes four virtual objects, and the second camp includes three virtual objects. All the virtual objects in the first camp wear ghillie suits, and two virtual objects in the second camp wear camouflage pants. The Easter egg configuration list includes a first clothing series to which the ghillie suit belongs and a second clothing series to which the camouflage pants belong, and a skin Easter egg 1 triggered by a quantity of clothes that are worn by virtual objects and that belong to the first clothing series and a skin Easter egg 2 triggered by a quantity of clothes that are worn by the virtual objects and that belong to the second clothing series.

Step 1703. Switch, if a quantity of skins that are worn by the plurality of virtual objects in the same camp and that belong to the same skin series reaches a threshold of triggering the skin Easter egg, a specified environment element in the virtual environment to a virtual environment element corresponding to the skin series, the virtual environment being a virtual environment for the plurality of virtual objects perform a battle arena game.

For example, a threshold of triggering the skin Easter egg 1 is 4, and a threshold of triggering the skin Easter egg 2 is 3. All the four virtual objects in the first camp wear the ghillie suits belonging to the first clothing series, which can trigger the skin Easter egg 1, so that all tree elements in the virtual environment are switched to environment elements corresponding to the first clothing series. The two virtual objects in the second camp wear the camouflage pants belonging to the second clothing series, which cannot trigger the skin Easter egg 2.

For example, the virtual objects in the first camp are used as an example, the threshold of triggering the skin Easter egg includes a first level and a second level, and the first level threshold is greater than the second level threshold. When a quantity of clothes that are worn by the virtual objects in the first camp and that belong to the first clothing series reaches the first level threshold, all the elements in the virtual environment are switched to the virtual environment elements corresponding to the first clothing series. When the quantity of clothes that are worn by the virtual objects in the first camp and that belong to the first clothing series reaches the second level threshold, all building elements and water flow elements in the virtual environment are switched to the virtual environment elements corresponding to the first clothing series.

For example, when a quantity of clothes that are worn by some virtual objects in the first camp and that belong to the first clothing series reaches a first threshold, a quantity of clothes that are worn by other virtual objects and that belong to the second clothing series reaches a third threshold, and a priority of the first clothing series is higher than a priority of the second clothing series, the building element in the virtual environment is switched to the virtual environment element corresponding to the first clothing series.

For example, when a quantity of clothes that are worn by some virtual objects in the first camp and that belong to the first clothing series reaches a first threshold, a quantity of clothes that are worn by other virtual objects and that belong to the second clothing series reaches a third threshold, and the first threshold is greater than the third threshold, a metal element in the virtual environment is switched to the virtual environment element corresponding to the first clothing series.

In some embodiments, the game client obtains a cloth worn by each virtual object. For example, there are 100 virtual objects in the virtual environment, and when 30 virtual objects wear ghillie suits, and a tree element in the virtual environment is switched to a shrub element.

In summary, according to the method provided in this embodiment, clothes worn by virtual objects are associated with a triggered skin Easter egg in an Easter egg configuration list. When a quantity of clothes that are worn by the virtual objects and that belong to the same clothing series reaches a threshold of triggering a skin Easter egg, a specified environment element in a virtual environment is automatically switched to an environment element corresponding to the clothing series. Switching of a corresponding environment element is automatically triggered according to clothes that are worn by the virtual objects and that belong to different clothing series, so that scene switching of the virtual environment is no longer limited to several fixed scenes provided by a system, and more scene types are provided for scene switching of the virtual environment, thereby improving a matching degree between the virtual object and the environment element, implementing personalized display of the virtual environment, and obtaining a good display effect.

It may be understood that the manner of determining to trigger the skin Easter egg according to a quantity of clothes and the manner of triggering the skin Easter egg according to the priority may be separately implemented, or may be implemented in a combination, or may be implemented in another combination.

The following is an apparatus embodiment of the disclosure. For details not described in detail in the apparatus embodiment, reference may be made to corresponding record in the foregoing method embodiments. Details are not described herein again.

Figure 18:
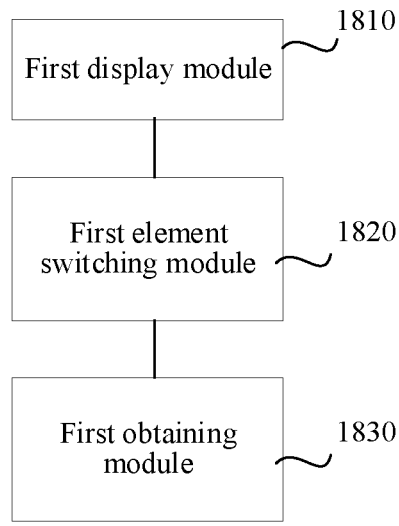
FIG. 18 is a block diagram of a virtual environment display apparatus according to an exemplary embodiment of the disclosure.

FIG. 18 is a schematic structural diagram of a virtual environment display apparatus according to an exemplary embodiment of the disclosure. The apparatus may be implemented as an entire terminal or a part of a terminal by using software, hardware, or a combination thereof. The apparatus includes a first display module 1810 and a first element switching module 1820.

The first display module 1810 is configured to display a first interface, the first interface including object display pages of a plurality of virtual objects belonging to a first group and object display pages of a plurality of virtual objects belonging to a second group, at least one virtual object having a skin on a corresponding object display page.

The first element switching module 1820 is configured to switch, if skins that are owned by the plurality of virtual objects in the same group and that belong to the same skin series meet a trigger condition, a specified environment element in a virtual environment to a virtual environment element corresponding to the skin series, the virtual environment being a virtual place for the plurality of virtual objects belonging to the first group and the plurality of virtual objects belonging to the second group to perform a movement.

The first display module 1810 is configured to display a second interface, the second interface including a picture acquired from the virtual environment, the virtual environment including the virtual environment element corresponding to the skin series.

In an embodiment, the apparatus further includes a first obtaining module 1830.

The first obtaining module 1830 is configured to obtain a skin list of the plurality of virtual objects in the same group, the same group including the first group or the second group.

The first element switching module 1820 is configured to match the skin list of the plurality of virtual objects in the same group with skin series in a positive feedback configuration list, the positive feedback configuration list being used for indicating a correspondence between a quantity of skins belonging to the same skin series and triggering of positive feedback, the positive feedback being used for switching the specified environment element in the virtual environment; and switch, in response that a quantity of skins that are worn by the plurality of virtual objects in the same group and that belong to the same skin series reaches a threshold of triggering the positive feedback, the specified environment element in virtual environment to the virtual environment element corresponding to the skin series.

In an embodiment, the first obtaining module 1830 is configured to obtain, if the quantity of skins that are owned by the plurality of virtual objects in the same group and that belong to the same skin series reaches the threshold of triggering the positive feedback, a second resource path of the virtual environment element corresponding to the skin series from the positive feedback configuration list; and the first element switching module 1820 is configured to switch a first resource path corresponding to the specified environment element to the second resource path; load the virtual environment element corresponding to the skin series according to the second resource path; and switch the specified environment element to the virtual environment element corresponding to the skin series.

In an embodiment, the first element switching module 1820 is configured to switch, if a quantity of skins that are owned by the plurality of virtual objects in the first group and that belong to a first skin series reaches a first threshold, a first specified environment element in the virtual environment to a first virtual environment element corresponding to the first skin series; and/or switch, if a quantity of skins that are owned by the plurality of virtual objects in the second group and that belong to a second skin series reaches a second threshold, a second specified environment element in the virtual environment to a second virtual environment element corresponding to the second skin series.

In an embodiment, the virtual environment includes a first map region owned by the first group and a second map region owned by the second group, and the first specified environment element is a virtual environment element belonging to the first map region; and the second specified environment element is a virtual environment element belonging to the second map region.

In an embodiment, the first element switching module 1820 is configured to switch, if the quantity of skins that are owned by the plurality of virtual objects in the first group and that belong to the first skin series reaches an $i^{th}$ level first threshold, the first specified environment element belonging to a first set in the virtual environment to the first virtual environment element corresponding to the first skin series, i being a positive integers; and/or switch, if the quantity of skins that are owned by the plurality of virtual objects in the first group and that belong to the first skin series reaches an $(i+1)^{th}$ level first threshold, the first specified environment element belonging to a second set in the virtual environment to the first virtual environment element corresponding to the first skin series, the $i^{th}$ level first threshold being greater than the $(i+1)^{th}$ level first threshold, a quantity of first specified environment elements in the first set being greater than a quantity of first specified environment element in the second set, and/or types of first specified environment elements in the first set being more than types of first specified environment elements in the second set.

In an embodiment, the first element switching module 1820 is configured to switch the first specified environment element in the virtual environment to the first virtual environment element corresponding to the first skin series if a quantity of skins that are owned by some virtual objects in the first group and that belong to the first skin series reaches the first threshold, a quantity of skins that are owned by other virtual objects in the first group and that belong to a third skin series reaches a third threshold, and a priority of the first skin series is higher than a priority of the third skin series; or switch the first specified environment element in the virtual environment to the first virtual environment element corresponding to the first skin series if a quantity of skins that are owned by some virtual objects in the first group and that belong to the first skin series reaches the first threshold, a quantity of skins that are owned by other virtual objects in the first group and that belong to a third skin series reaches a third threshold, and the first threshold is greater than the third threshold.

In an embodiment, the virtual environment element includes at least one of an automatically controlled virtual character (for example, a virtual soldier) in each camp, a neutral character (for example, a neutral creature) that does not belong to any group in the virtual environment, a virtual decoration unit, a virtual map element, a background music element, a voice broadcast element, a control broadcast element, and an interface control element.

In summary, according to the apparatus provided in this embodiment, a relationship between a skin worn by a virtual object and switching of a specified environment element in a virtual environment is established, and when skins that are worn by a plurality of virtual objects in the same camp and that belong to the same skin series meet a trigger condition, the specified environment element in the virtual environment is switched to a virtual environment element corresponding to the skin series. Switching of a corresponding environment element is triggered according to skins that are worn by the virtual objects and that belong to different skin series, so that scene switching of the virtual environment is no longer limited to several fixed scenes provided by a system, and more scene types are provided for scene switching of the virtual environment, thereby improving a matching degree between the virtual object and the environment element, implementing personalized display of the virtual environment, and obtaining a good display effect.

The threshold is ranked, and when a quantity of skins that are worn by virtual objects in the same camp and that belong to the same skin series reaches a threshold of a level, specified environment elements in a set corresponding to the threshold of the level are switched in batches. Therefore, a manner of switching an environment element is richer, and the virtual environment can be switched between a plurality of scene types.

When the skins worn by the virtual objects in the same camp can simultaneously meet switching of virtual environment elements corresponding to a plurality of skin series, it is determined, according to priorities of the skin series, that the specified environment element in the virtual environment is switched to a virtual environment element corresponding to a skin series with a highest priority, and on the premise that the plurality of scene types can be switched for the virtual environment, styles of environment elements in the virtual environment are ensured to have unity.

When the skins worn by the virtual objects in the same camp meet a plurality of thresholds, it is determined, according to the thresholds, that the specified environment element in the virtual environment is switched to a virtual environment element corresponding to a skin series meeting a relatively large threshold, and on the premise that the plurality of scene types can be switched for the virtual environment, styles of environment elements in the virtual environment are ensured to have unity.

Figure 19:
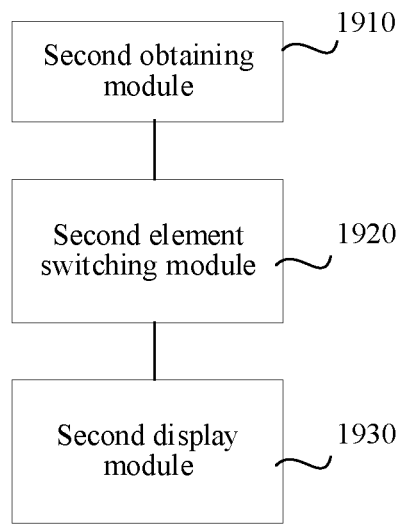
FIG. 19 is a block diagram of a virtual environment display apparatus according to another exemplary embodiment of the disclosure.

FIG. 19 is a schematic structural diagram of a virtual environment display apparatus according to an exemplary embodiment of the disclosure. The apparatus may be implemented as an entire terminal or a part of a terminal by using software, hardware, or a combination thereof. In this embodiment, the apparatus may include a second display module, configured to display a first interface, the first interface including object display pages of a plurality of virtual objects belonging to a first group and object display pages of a plurality of virtual objects belonging to a second group. The apparatus may further include a second obtaining module 1910, a second element switching module 1920, and a second display module 1930.

The second obtaining module 1910 is configured to obtain map fragments owned by the plurality of virtual objects belonging to the first group and map fragments owned by the plurality of virtual objects belonging to the second group.

The second element switching module 1920 is configured to switch, if a quantity of map fragments that are owned by the plurality of virtual objects in the same group and that belong to the same environment series reaches a threshold, a specified environment element in a virtual environment to a virtual environment element corresponding to the environment series, the virtual environment being a virtual place for the plurality of virtual objects belonging to the first group and the plurality of virtual objects belonging to the second group to perform a movement.

The second display module 1930 is configured to display a second interface, the second interface including a picture acquired from the virtual environment, the virtual environment including the virtual environment element corresponding to the environment series.

Figure 20:
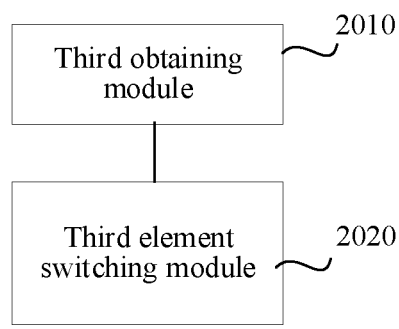
FIG. 20 is a block diagram of a virtual environment display apparatus according to another exemplary embodiment of the disclosure.

FIG. 20 is a schematic structural diagram of a virtual environment display apparatus according to an exemplary embodiment of the disclosure. The apparatus may be implemented as an entire terminal or a part of a terminal by using software, hardware, or a combination thereof. The apparatus includes a third obtaining module 2010 and a third element switching module 2020.

The third obtaining module 2010 is configured to obtain a skin list of the plurality of virtual objects belonging to the first group and a skin list of the plurality of virtual objects belonging to the second group.

The third element switching module 2020 is configured to match the skin list of the plurality of virtual objects in the same group with skin series in a positive feedback configuration list, the positive feedback configuration list being used for indicating a correspondence between a quantity of skins belonging to the same skin series and triggering of positive feedback, the positive feedback being used for switching the specified environment element in the virtual environment; and switch, in response that a quantity of skins that are owned by the plurality of virtual objects in the same group and that belong to the same skin series reaches a threshold of triggering the positive feedback, the specified environment element in the virtual environment to the virtual environment element corresponding to the skin series, the virtual environment being a virtual place for the plurality of virtual objects belonging to the first group and the plurality of virtual objects belonging to the second group to perform a movement.

In an embodiment, the third obtaining module 2010 is configured to obtain a second resource path of the virtual environment element corresponding to the skin series from the positive feedback configuration list if the quantity of skins that are owned by the plurality of virtual objects in the same group and that belong to the same skin series reaches the threshold of triggering the positive feedback; and the third element switching module 2020 is configured to switch a first resource path corresponding to the specified environment element to the second resource path; load the virtual environment element corresponding to the skin series according to the second resource path; and switch the specified environment element to the virtual environment element corresponding to the skin series.

Figure 21:
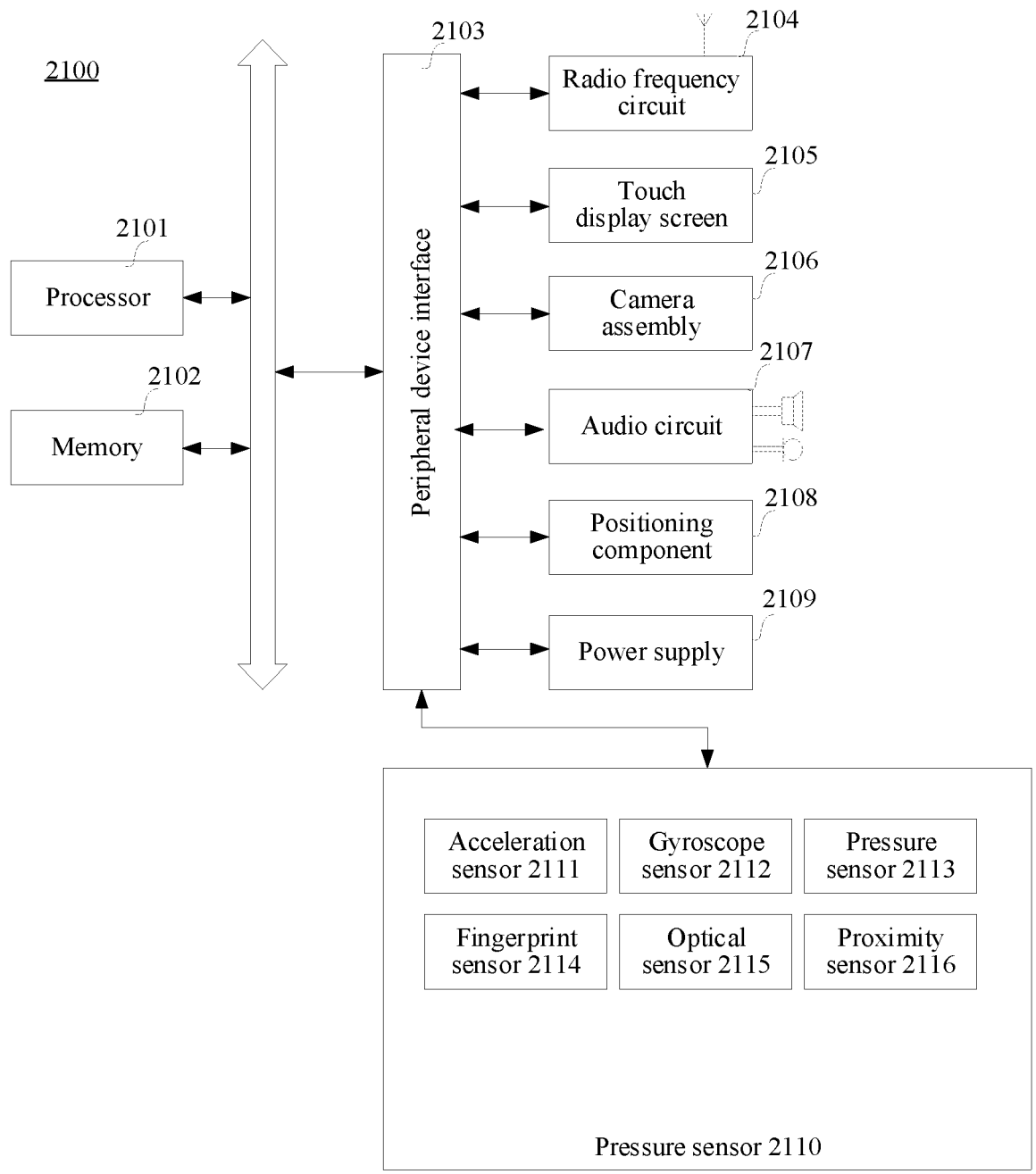
FIG. 21 is a schematic structural diagram of an apparatus of a computer device according to an exemplary embodiment of the disclosure.

FIG. 21 shows a structural block diagram of a computer device 2100 according to an exemplary embodiment of the disclosure. The computer device 2100 may be a portable mobile terminal, such as a smartphone, a tablet computer, a moving picture experts group audio layer III (MP3) player, or a moving picture experts group audio layer (MP4) player. The computer device 2100 may be further referred to as another name such as user equipment or a portable terminal.

Generally, the computer device 2100 includes a processor 2101 and a memory 2102.

The processor 2101 may include one or more processing cores, for example, a 4-core processor or an 8-core processor. The processor 2101 may be implemented in at least one hardware form of a digital signal processor (DSP), a field-programmable gate array (FPGA), and a programmable logic array (PLA). The processor 2101 may alternatively include a main processor and a coprocessor. The main processor is a processor configured to process data in an awake state, and is also referred to as a central processing unit (CPU). The coprocessor is a low power consumption processor configured to process the data in a standby state. In some embodiments, the processor 2101 may be integrated with a graphics processing unit (GPU). The GPU is configured to render and draw content that needs to be displayed on a display screen. In some embodiments, the processor 2101 may further include an artificial intelligence (AI) processor. The AI processor is configured to process computing operations related to machine learning.

The memory 2102 may include one or more computer-readable storage media. The computer-readable storage medium may be tangible and non-transient. The memory 2102 may further include a high-speed random access memory and a non-volatile memory, for example, one or more disk storage devices or flash memory devices. In some embodiments, the non-transitory computer-readable storage medium in the memory 2102 is configured to store at least one instruction, and the at least one instruction is configured to be executed by the processor 2101 to implement the virtual environment displayed method provided in the embodiments of the disclosure.

In some embodiments, the computer device 2100 further includes a peripheral device interface 2103 and at least one peripheral device. Specifically, the peripheral device includes: at least one of a radio frequency (RF) circuit 2104, a touch display screen 2105, a camera 2106, an audio circuit 2107, a positioning component 2108, and a power supply 2109.

In some embodiments, the computer device 2100 may further include one or more sensors 2110. The one or more sensors 2110 include, but are not limited to, an acceleration sensor 2111, a gyroscope sensor 2112, a pressure sensor 2113, a fingerprint sensor 2114, an optical sensor 2115, and a proximity sensor 2116.

A person skilled in the art may understand that the structure shown in FIG. 21 does not constitute any limitation on the computer device 2100, and the computer device may include more components or fewer components than those shown in the figure, or some components may be combined, or a different component deployment may be used.

The embodiments of the disclosure further provide a computer device. The computer device includes processor and a memory. The memory stores at least one instruction, at least one program, a code set, or an instruction set. The at least one instruction, the at least one program, the code set, or the instruction set is loaded and executed by the processor to implement the virtual environment display method according to the foregoing method embodiments.

The embodiments of the disclosure further provide a computer-readable storage medium, storing at least one instruction, at least one program, a code set or an instruction set, the at least one instruction, the at least one program, the code set or the instruction set being loaded and executed by a processor to implement the virtual environment display method according to the foregoing method embodiments.

The embodiments of the disclosure further provide a computer program product, the computer program product, when run on a computer, causing the computer to perform the virtual environment display method according to the foregoing method embodiments.

It is to be understood that "plurality of" mentioned in this specification means two or more. "And/or" describes an association relationship for describing associated objects and represents that three relationships may exist. For example, A and/or B may represent the following three cases: Only A exists, both A and B exist, and only B exists. The character "/" in this specification generally indicates an "or" relationship between the associated objects.

A person of ordinary skill in the art may understand that all or some of the steps of the foregoing embodiments may be implemented by hardware, or may be implemented a program instructing related hardware. The program may be stored in a computer-readable storage medium. The storage medium may be: a ROM, a magnetic disk, or an optical disc.

The foregoing descriptions are merely embodiments of the disclosure, but are not intended to limit the disclosure. Any modification, equivalent replacement, and improvement made without departing from the principle of the disclosure shall fall within the protection scope of the disclosure.

What is claimed is:

1. A virtual environment display method, performed by a terminal, the method comprising:
   displaying, on a display of the terminal, a first round beginning interface,
      the first round beginning interface comprising first object display pages of a plurality of virtual objects belonging to a first group and second object display pages of a plurality of virtual objects belonging to a second group, and
      a respective object display page comprising a respective skin for a respective virtual object;
   displaying, on the display of the terminal, a first interface comprising a virtual environment with a plurality of environment elements,
      the virtual environment comprising a virtual place for the plurality of virtual objects belonging to the first group and the plurality of virtual objects belonging to the second group to perform a movement;
   scene switching to a custom scene, on the display of the terminal, by switching of at least one first environment element in the virtual environment to at least one first skin environment element corresponding to a skin series, in response to skins corresponding to the plurality of virtual objects in the first group or corresponding to the plurality of virtual objects in the second group belonging to the skin series meeting a trigger condition; and
   displaying, on the display of the terminal, a second interface comprising the custom scene from the virtual environment that includes the at least one first skin environment element instead of the at least one first environment element.

2. The method according to claim 1, wherein the switching comprises:
   obtaining a skin list of the plurality of virtual objects in the same group, the same group comprising the first group or the second group;
   matching the skin list of the plurality of virtual objects in the same group with skin series in a positive feedback configuration list, the positive feedback configuration list being used for indicating a correspondence between a quantity of skins belonging to the same skin series and triggering of positive feedback, the positive feedback being used for switching the specified environment element in the virtual environment; and
   switching, in response to a quantity of skins that are owned by the plurality of virtual objects in the same group and that belong to the same skin series reaching a threshold of triggering the positive feedback, the specified environment element in the virtual environment to the virtual environment element corresponding to the skin series.

3. The method according to claim 2, wherein the switching, in response to a quantity of skins that are owned by the plurality of virtual objects in the same group and that belong to the same skin series reaching a threshold of triggering the positive feedback, the specified environment element in the virtual environment to the virtual environment element corresponding to the skin series comprises:
   obtaining, in response to the quantity of skins that are owned by the plurality of virtual objects in the same group and that belong to the same skin series reaching the threshold of triggering the positive feedback, a second resource path of the virtual environment element corresponding to the skin series from the positive feedback configuration list;
   switching a first resource path corresponding to the specified environment element to the second resource path;
   loading the virtual environment element corresponding to the skin series according to the second resource path; and
   switching the specified environment element to the virtual environment element corresponding to the skin series.

4. The method according to claim 1, wherein the scene switching comprises at least one of:
   displaying the custom scene comprising displaying a switching of a first specified environment element in the virtual environment to a first virtual environment element corresponding to a first skin series, in response to a quantity of skins that are owned by the plurality of virtual objects in the first group and that belong to the first skin series reaching a first threshold; and
   displaying the custom scene comprising displaying a switching of a second specified environment element in the virtual environment to a second virtual environment element corresponding to a second skin series, in response to a quantity of skins that are owned by the plurality of virtual objects in the second group and that belong to the second skin series reaching a second threshold.

5. The method according to claim 4, wherein the virtual environment comprises a first map region owned by the first group and a second map region owned by the second group;
   the first specified environment element is a virtual environment element belonging to the first map region; and
   the second specified environment element is a virtual environment element belonging to the second map region.

6. The method according to claim 4, wherein the first threshold has at least two levels, and the displaying the switching of the first specified environment element comprises:
   switching, in response to the quantity of skins that are owned by the plurality of virtual objects in the first group and that belong to the first skin series reaching an $i^{th}$ level first threshold, the first specified environment element belonging to a first set in the virtual environment to the first virtual environment element corresponding to the first skin series, i being a positive integer; and switching, in response to the quantity of skins that are owned by the plurality of virtual objects in the first group and that belong to the first skin series reaching an $(i+1)^{th}$ level first threshold, the first specified environment element belonging to a second set in the virtual environment to the first virtual environment element corresponding to the first skin series, the $i^{th}$ level first threshold being greater than the $(i+1)^{th}$ level first threshold, a quantity of first specified environment elements in the first set being greater than a quantity of first specified environment elements in the second set, and/or types of first specified environment elements in the first set being more than types of first specified environment elements in the second set.

7. The method according to claim 4, wherein the displaying the switching of the first specified environment element comprises one of:

switching the first specified environment element in the virtual environment to the first virtual environment element corresponding to the first skin series in response to a quantity of skins that are owned by some virtual objects in the first group and that belong to the first skin series reaching the first threshold, a quantity of skins that are owned by other virtual objects in the first group and that belong to a third skin series reaches a third threshold, and a priority of the first skin series is higher than a priority of the third skin series; and switching the first specified environment element in the virtual environment to the first virtual environment element corresponding to the first skin series in response to the quantity of skins that are owned by some virtual objects in the first group and that belong to the first skin series reaching the first threshold, the quantity of skins that are owned by other virtual objects in the first group and that belong to the third skin series reaches the third threshold, and the first threshold is greater than the third threshold.

8. The method according to claim 1, wherein the virtual environment element comprises at least one of an automatically controlled virtual role in each group, a neutral role that does not belong to any group in the virtual environment, a virtual decoration unit, a virtual map element, a background music element, a voice broadcast element, a control broadcast element, and an interface control element.

9. A virtual environment display apparatus, comprising:
a display;
at least one memory storing program code;
at least one processor configured to access the program code and operate as instructed by the program code, the program code including:
first display code configured to cause the at least one processor to display, on the display, a first round beginning interface, the first round beginning interface comprising first object display pages of a plurality of virtual objects belonging to a first group and second object display pages of a plurality of virtual objects belonging to a second group, at least one virtual object having a skin on a corresponding object display page, and a respective object display page comprising a respective skin for a respective virtual object;
second display code configured to cause the at least one processor to display, on the display, a first interface comprising a virtual environment with a plurality of environment elements, the virtual environment comprising a virtual place for the plurality of virtual objects belonging to the first group and the plurality of virtual objects belonging to the second group to perform a movement;
first element switching code configured to cause the at least one processor to scene switch to a custom scene, on the display, by switching of at least one first environment element in the virtual environment to at least one first skin environment element corresponding to a skin series, in response to skins corresponding to the plurality of virtual objects in the first group or corresponding to the plurality of virtual objects in the second group belonging the skin series meeting a trigger condition, and
the first display code being further configured to cause the at least one processor to display, on the display, a second interface comprising the custom scene from the virtual environment that includes the at least one first skin environment element instead of the at least one first environment element.

10. The virtual environment display apparatus according to claim 9, wherein the first element switching code is further configured to cause the at least one processor to:
obtain a skin list of the plurality of virtual objects in the same group, the same group comprising the first group or the second group;
match the skin list of the plurality of virtual objects in the same group with skin series in a positive feedback configuration list, the positive feedback configuration list being used for indicating a correspondence between a quantity of skins belonging to the same skin series and triggering of positive feedback, the positive feedback being used for switching the specified environment element in the virtual environment; and
switch, in response to a quantity of skins that are owned by the plurality of virtual objects in the same group and that belong to the same skin series reaching a threshold of triggering the positive feedback, the specified environment element in the virtual environment to the virtual environment element corresponding to the skin series.

11. The virtual environment display apparatus according to claim 10, wherein the switching, in response to a quantity of skins that are owned by the plurality of virtual objects in the same group and that belong to the same skin series reaching a threshold of triggering the positive feedback, the specified environment element in the virtual environment to the virtual environment element corresponding to the skin series comprises:
obtaining, in response to the quantity of skins that are owned by the plurality of virtual objects in the same group and that belong to the same skin series reaching the threshold of triggering the positive feedback, a second resource path of the virtual environment element corresponding to the skin series from the positive feedback configuration list;
switching a first resource path corresponding to the specified environment element to the second resource path;
loading the virtual environment element corresponding to the skin series according to the second resource path; and
switching the specified environment element to the virtual environment element corresponding to the skin series.

12. The virtual environment display apparatus according to claim 9, the first element switching code comprises at least one of:

displaying the custom scene comprising displaying a switching of a first specified environment element in the virtual environment to a first virtual environment element corresponding to a first skin series, in response to a quantity of skins that are owned by the plurality of virtual objects in the first group and that belong to the first skin series reaching a first threshold; and displaying the custom scene comprising displaying a switching of a second specified environment element in the virtual environment to a second virtual environment element corresponding to a second skin series, in response to a quantity of skins that are owned by the plurality of virtual objects in the second group and that belong to the second skin series reaching a second threshold.

13. The virtual environment display apparatus according to claim 12, wherein
the virtual environment comprises a first map region owned by the first group and a second map region owned by the second group;
the first specified environment element is a virtual environment element belonging to the first map region; and
the second specified environment element is a virtual environment element belonging to the second map region.

14. The virtual environment display apparatus according to claim 12, wherein the first threshold has at least two levels, and displaying the switching of the first specified environment element comprises:
switching, in response to the quantity of skins that are owned by the plurality of virtual objects in the first group and that belong to the first skin series reaching an $i^{th}$ level first threshold, the first specified environment element belonging to a first set in the virtual environment to the first virtual environment element corresponding to the first skin series, i being a positive integer; and
switching, in response to the quantity of skins that are owned by the plurality of virtual objects in the first group and that belong to the first skin series reaching an $(i+1)^{th}$ level first threshold, the first specified environment element belonging to a second set in the virtual environment to the first virtual environment element corresponding to the first skin series,
the $i^{th}$ level first threshold being greater than the $(i+1)^{th}$ level first threshold, a quantity of first specified environment elements in the first set being greater than a quantity of first specified environment elements in the second set, and/or types of first specified environment elements in the first set being more than types of first specified environment elements in the second set.

15. The virtual environment display apparatus according to claim 12, wherein displaying the switching of the first specified environment element comprises one of:
switching the first specified environment element in the virtual environment to the first virtual environment element corresponding to the first skin series in response to a quantity of skins that are owned by some virtual objects in the first group and that belong to the first skin series reaching the first threshold, a quantity of skins that are owned by other virtual objects in the first group and that belong to a third skin series reaches a third threshold, and a priority of the first skin series is higher than a priority of the third skin series; and
switching the first specified environment element in the virtual environment to the first virtual environment element corresponding to the first skin series in response to the quantity of skins that are owned by some virtual objects in the first group and that belong to the first skin series reaching the first threshold, the quantity of skins that are owned by other virtual objects in the first group and that belong to the third skin series reaches the third threshold, and the first threshold is greater than the third threshold.

16. The virtual environment display apparatus according to claim 9, wherein the virtual environment element comprises at least one of an automatically controlled virtual role in each group, a neutral role that does not belong to any group in the virtual environment, a virtual decoration unit, a virtual map element, a background music element, a voice broadcast element, a control broadcast element, and an interface control element.

17. A non-transitory computer readable storage medium storing computer program code that, when executed by at least one processor, causes the at least one processor to:
display, on a display, a first round beginning interface, the first round beginning interface comprising first object display pages of a plurality of virtual objects belonging to a first group and second object display pages of a plurality of virtual objects belonging to a second group, at least one virtual object having a skin on a corresponding object display page, and a respective object display page comprising a respective skin for a respective virtual object;
display, on the display, a first interface comprising a virtual environment with a plurality of environment elements, the virtual environment comprising a virtual place for the plurality of virtual objects belonging to the first group and the plurality of virtual objects belonging to the second group to perform a movement;
scene switching to a custom scene, on the display of the terminal, by switching of at least one first environment element in the virtual environment to at least one first skin environment element corresponding to a skin series, in response to skins corresponding to the plurality of virtual objects in the first group or corresponding to the plurality of virtual objects in the second group belonging to the skin series meeting a trigger condition; and
display, on the display, a second interface comprising the custom scene from the virtual environment that includes the at least one first skin environment element instead of the at least one first environment element.

18. The non-volatile computer readable storage medium according to claim 17, wherein the switching comprises:
obtaining a skin list of the plurality of virtual objects in the same group, the same group comprising the first group or the second group;
matching the skin list of the plurality of virtual objects in the same group with skin series in a positive feedback configuration list, the positive feedback configuration list being used for indicating a correspondence between a quantity of skins belonging to the same skin series and triggering of positive feedback, the positive feedback being used for switching the specified environment element in the virtual environment; and
switching, in response to a quantity of skins that are owned by the plurality of virtual objects in the same group and that belong to the same skin series reaching a threshold of triggering the positive feedback, the specified environment element in the virtual environment to the virtual environment element corresponding to the skin series.

19. The non-volatile computer readable storage medium according to claim 18, wherein the switching, in response to a quantity of skins that are owned by the plurality of virtual objects in the same group and that belong to the same skin series reaching a threshold of triggering the positive feedback comprises:
- obtaining, in response to the quantity of skins that are owned by the plurality of virtual objects in the same group and that belong to the same skin series reaching the threshold of triggering the positive feedback, a second resource path of the virtual environment element corresponding to the skin series from the positive feedback configuration list;
- switching a first resource path corresponding to the specified environment element to the second resource path;
- loading the virtual environment element corresponding to the skin series according to the second resource path; and
- switching the specified environment element to the virtual environment element corresponding to the skin series.

20. The non-transitory computer readable storage medium according to claim 17, wherein the scene switching comprises at least one of:
- displaying the custom scene comprising displaying a switching of a first specified environment element in the virtual environment to a first virtual environment element corresponding to a first skin series, in response to a quantity of skins that are owned by the plurality of virtual objects in the first group and that belong to the first skin series reaching a first threshold; and
- displaying the custom scene comprising displaying a switching of a second specified environment element in the virtual environment to a second virtual environment element corresponding to a second skin series, in response to a quantity of skins that are owned by the plurality of virtual objects in the second group and that belong to the second skin series reaching a second threshold.

* * * * *